US008886641B2

(12) United States Patent
Dong et al.

(10) Patent No.: US 8,886,641 B2
(45) Date of Patent: Nov. 11, 2014

(54) INCORPORATING RECENCY IN NETWORK SEARCH USING MACHINE LEARNING

(75) Inventors: Anlei Dong, Fremont, CA (US); Yi Chang, Santa Clara, CA (US); Ruiqiang Zhang, Cupertino, CA (US); Zhaohui Zheng, Mountain View, CA (US); Gilad Avraham Mishne, Oakland, CA (US); Jing Bai, San Jose, CA (US); Karolina Barbara Buchner, San Jose, CA (US); Ciya Liao, Fremont, CA (US); Shihao Ji, Santa Clara, CA (US); Gilbert Leung, Mountain View, CA (US); Georges-Eric Albert Marie Robert Dupret, Mountain View, CA (US); Ling Liu, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 935 days.

(21) Appl. No.: 12/579,855

(22) Filed: Oct. 15, 2009

(65) Prior Publication Data
US 2011/0093459 A1 Apr. 21, 2011

(51) Int. Cl.
*G06F 17/30* (2006.01)
(52) U.S. Cl.
CPC .............................. *G06F 17/30867* (2013.01)
USPC ....................................................... 707/725
(58) Field of Classification Search
USPC .................. 707/999.004, 736, 721, 768, 725; 715/738
See application file for complete search history.

(56) References Cited

U.S. PATENT DOCUMENTS

| | | | | |
|---|---|---|---|---|
| 7,552,128 B2 * | 6/2009 | Bhalotia et al. | ............ | 707/999.1 |
| 7,934,161 B1 * | 4/2011 | Denise | ............ | 715/738 |
| 7,979,425 B2 * | 7/2011 | Garg et al. | ............ | 707/721 |
| 8,065,301 B2 * | 11/2011 | Ginsburg et al. | ............ | 707/736 |
| 8,185,544 B2 * | 5/2012 | Oztekin et al. | ............ | 707/768 |

OTHER PUBLICATIONS

Arikan et al., "Time Will Tell: Leveraging Temporal Expressions in IR," *WSDM '09*, Barcelona, Spain, Feb. 9-12, 2009, 4 pages.
Baeza-Yates et al., "Web Dynamics, Structure, and Page Quality," *Proceedings of the 9th International Symposium on String Processing and Information Retrieval*, Lisbon, Portugal, 2002, 17 pages.
Berberich et al., "Time-Aware Authority Ranking," *Internet Mathematics* 2(3): 301-332 (2005).
Burges et al., "Learning to Rank Using Gradient Descent," *Proceedings of the 22nd International Conference on Machine Learning*, Bonn, Germany, 2005, 8 pages.
Cao et al., "Learning to Rank: From Pairwise Approach to Listwise Approach," *Proceedings of the 24th International Conference on Machine Learning*, Corvallis, OR, 2007, 9 pages.

(Continued)

*Primary Examiner* — Sathyanarayan Pannala
(74) *Attorney, Agent, or Firm* — Pillsbury Winthrop Shaw Pittman LLP

(57) ABSTRACT

In one embodiment, access a set of recency ranking data comprising one or more recency search queries and one or more recency search results, each of the recency search queries being recency-sensitive with respect to a particular time period and being associated with a query timestamp representing the time at which the recency search query is received at a search engine, each of the recency search results being generated by the search engine for one of the recency search queries and comprising one or more recency network resources. Construct a plurality of recency features from the set of recency ranking data. Train a first ranking model via machine learning using at least the recency features.

34 Claims, 4 Drawing Sheets

(56) References Cited

OTHER PUBLICATIONS

Cho et al., "Page Quality: In Search of an Unbiased Web Ranking," *Proceedings of the 2005 ACM SIGMOD International Conference on Management of Data*, Baltimore, MD, Jun. 14-16, 2005, pp. 551-562.
De Jong et al., "Temporal Language Models for the Disclosure of Historical Text," *Proceedings of the 16th International Conference of the Association for History and Computing*, Amsterdam, The Netherlands, Sep. 14-17, 2005, 9 pages.
Del Corso et al., "Ranking a Stream of News," *Proceedings of the 14th International World Wide Web Conference*, Chiba, Japan, May 10-14, 2005 pp. 97-106.
Diaz, "Integration of News Contenct into Web Results," *Proceedings of the 2nd ACM International Conference on Web Search and Data Mining*, Barcelona, Spain, Feb. 9-12, 2009, 10 pages.
Freund et al., "An Efficient Boosting Algorithm for Combining Preferences," *Journal of Machine Learning Research* 4: 933-969 (2003).
Friedman, "Greedy Function Approximation: A Gradient Boosting Machine," Technical Discussion: Foundations of TreeNet(tm), Feb. 24, 1999, 34 pages.
Jarvelin et al., "Cumulated Gain-based Evaluation of IR Techniques," *ACM Transactions on Information Systems* 20: 422-446 (2002).
Joachims, "Optimizing Search Engines Using Clickthrough Data," *Proceedings of the 8th ACM SIGKDD International Conference on Knowledge Discovery and Data Mining*, Edmonton, Alberta, Canada, Jul. 23-26, 2002, pp. 133-142.
Kanhabua et al., "Improving Temporal Language Models for Determining Time of Non-Timestamped Documents," Lecture Notes in Computer Science, vol. 5173, *Proceedings of the 12th European Conference on Research and Advanced Technology for Digital Libraries*, Aarhus, Denmark, Sep. 14-19, 2008, pp. 358-370.
Kleinberg, "Bursty and Hierarchical Structure in Streams," *Proceedings of the 8th ACM SIGKDD International Conference on Knowledge Discovery and Data Mining*, Edmonton, Alberta, Canada, Jul. 23-26, 2002, pp. 91-101.
König et al., "Click-Through Prediction for News Queries," *Proceedings of the 32nd International ACM SIGIR Conference on Research and Development in Information Retrieval*, Boston, MA, Jul. 19-23, 2009, pp. 347-354.
Lappas et al., "On Burstiness-Aware Search for Document Sequences," *Proceedings of the 15th ACM SIGKDD International Conference on Knowledge Discovery and Data Mining*, Paris, France, Jun. 28-Jul. 1, 2009, pp. 477-486.
Li et al., "Time-Based Language Models," *Proceedings of the 12th International Conference on Information and Knowledge Management*, New Orleans, LA, Nov. 3-8, 2003, pp. 469-475.
Li et al., "Time Sensitive Ranking with Application to Publication Search," *Proceedings of the Eighth IEEE International Conference on Data Mining*, Dec. 15-19, 2008, pp. 893-898.
Li et al., "Learning Query Intent from Regularized Click Graphs," *Proceedings of the 31st Annual International ACM SIGIR Conference on Research and Development in Information Retrieval*, Singapore, Jul. 20-24, 2008.
Liu, "Learning to Rank for Information Retrieval," a tutorial presented at the *18th International World Wide Web Conference*, Madrid, Spain, Apr. 20, 2009, 67 pages.
Nunes et al., "Exploring Temporal Evidence in Web Information Retrieval," *Proceedings of the BCS IRSG Symposium: Future Directions in Information Access (FDIA 2007)*, 2007, 6 pages.
Pandey et al., "Shuffling a Stacked Deck: The Case for Partially Randomized Ranking of Search Engine Results," *Proceedings of the 31st International Conference on Very Large Data Bases*, Trondheim, Norway, Aug. 30-Sep. 2, 2005, pp. 781-792.
Pasca, "Towards Temporal Web Search," *Proceedings of the 2008 ACM Symposium on Applied Computing*, Fortaleza, Ceara, Brazil, Mar. 16-20, 2008, pp. 1117-1121.
Vlachos et al., "Identifying Similarities, Periodicities and Bursts for Online Search Queries," Proceedings of the 2004 ACM SIGMOD International Conference on Management of Data, Paris, France, Jun. 13-18, 2004, pp. 131-142.
Wang et al., "Learn from Web Search Logs to Organize Search Results," *Proceedings of the 30th Annual International ACM SIGIR Conference on Research and Development in Information Retrieval*, Amsterdam, The Netherlands, Jul. 23-27, 2007, pp. 87-94.
Zhang et al., "Search Result Re-ranking by Feedback Control Adjustment for Time-sensitive Query," *North American Chapter of the Association for Computational Linguistics—Human Language Technologies (NAACL HLT)*, 2009, 4 pages.
Zheng et al., "A General Boosting Method and its Application to Learning Ranking Functions for Web Search," *Advances in Neural Information Processing Systems*, 2007, 8 pages.

\* cited by examiner

⬈ 100

⬈ 110

112 ⟶ George Washington - Wikipedia, the free encyclopedia
114 ⟶ George Washington was the leader of the Continental Army in the American Revolutionary War (1775–1783) and served as the first President of the United States of America (1789–1797).
116 ⟶ en.wikipedia.org/wiki/George_Washington - 257k - Cached

⬈ 120

122 ⟶ Biography of George Washington
124 ⟶ WhiteHouse.gov is the official web site for the White House and President Barack Obama, the 44th President of the United States. This site is a source for
126 ⟶ ...
www.whitehouse.gov/about/presidents/georgewashington - 54k - Cached

⬈ 130

132 ⟶ George Washington: Biography from Answers.com
134 ⟶ George Washington , U.S. President / Military Leader / Revolutionary War Figure Born: 22 February 1732 Birthplace: Westmoreland County, Virginia
136 ⟶ Died:
www.answers.com/topic/george-washington - 480k - Cached

⬈ 140

142 ⟶ President George Washington
144 ⟶ US Presidential Trivia for fun and learning. The site also has lesson ideas and activities for K-12 students. This page features George Washington.
146 ⟶ www.classroomhelp.com/lessons/Presidents/washington.html - Cached

⬈ 150

152 ⟶ American President: George Washington
154 ⟶ In-depth essays created by the University of Virginia on George Washington's life and administration. ... George Washington. At a Glance. Term: 1st President
156 ⟶ ...
millercenter.org/academic/americanpresident/washington - Cached

FIGURE 1

INCORPORATING RECENCY IN NETWORK SEARCH USING MACHINE LEARNING

TECHNICAL FIELD

The present disclosure generally relates to improving the quality of the search results generated by the search engines and more specifically relates to taking into consideration the recency (i.e., the time sensitivity) of the search queries or of the network resources identified for the search queries when ranking the network resources with respect to the search queries.

BACKGROUND

The Internet provides a vast amount of information. The individual pieces of information are often referred to as "network resources" or "network contents" and may have various formats, such as, for example and without limitation, texts, audios, videos, images, web pages, documents, executables, etc. The network resources or contents are stored at many different sites, such as on computers and servers, in databases, etc., around the world. These different sites are communicatively linked to the Internet through various network infrastructures. Any person may access the publicly available network resources or contents via a suitable network device (e.g., a computer) connected to the Internet.

However, due to the sheer amount of information available on the Internet, it is impractical as well as impossible for a person (e.g., a network user) to manually search throughout the Internet for specific pieces of information. Instead, most people rely on different types of computer-implemented tools to help them locate the desired network resources or contents. One of the most commonly and widely used computer-implemented tools is a search engine, such as the search engines provided by Yahoo!® Inc. (http://search.yahoo.com) and Google™ Inc. (http://www.google.com). To search for information relating to a specific subject matter on the Internet, a network user typically provides a short phrase or a few keywords describing the subject matter, often referred to as a "search query", to a search engine. The search engine conducts a search based on the search query using various search algorithms and generates a search result that identifies network resources or contents that are most likely to be related to the search query. The network resources or contents are presented to the network user, often in the form of a list of links, each link being associated with a different document (e.g., a web page) that contains some of the identified network resources or contents. In particular embodiments, each link is in the form of a Uniform Resource Locator (URL) that specifies where the corresponding document is located and the mechanism for retrieving it. The network user is then able to click on the URL links to view the specific network resources or contents contained in the corresponding document as he wishes.

Sophisticated search engines implement many other functionalities in addition to merely identifying the network resources or contents as a part of the search process. For example, a search engine usually ranks the identified network resources or contents according to their relative degrees of relevance with respect to the search query, such that the network resources or contents that are relatively more relevant to the search query are ranked higher and consequently are presented to the network user before the network resources or contents that are relatively less relevant to the search query. The search engine may also provide a short summary of each of the identified network resources or contents.

There are continuous efforts to improve the qualities of the search results generated by the search engines. Accuracy, completeness, presentation order, and speed are but a few of the performance aspects of the search engines for improvement.

SUMMARY

The present disclosure generally relates to improving the quality of the search results generated by the search engines and more specifically relates to taking into consideration the recency of the search queries or the network resources identified for the search queries when ranking the network resources with respect to the search queries.

Particular embodiments may access a set of recency ranking data comprising one or more recency search queries and one or more recency search results, each of the recency search queries being recency-sensitive with respect to a particular time period and being associated with a query timestamp representing the time at which the recency search query is received at a search engine, each of the recency search results being generated by the search engine for one of the recency search queries and comprising one or more recency network resources; construct a plurality of recency features from the set of recency ranking data; and train a first ranking model via machine learning using at least the recency features.

These and other features, aspects, and advantages of the disclosure are described in more detail below in the detailed description and in conjunction with the following figures.

BRIEF DESCRIPTION OF THE DRAWINGS

FIG. 1 illustrates an example search result.

DETAILED DESCRIPTION

Figure 2:
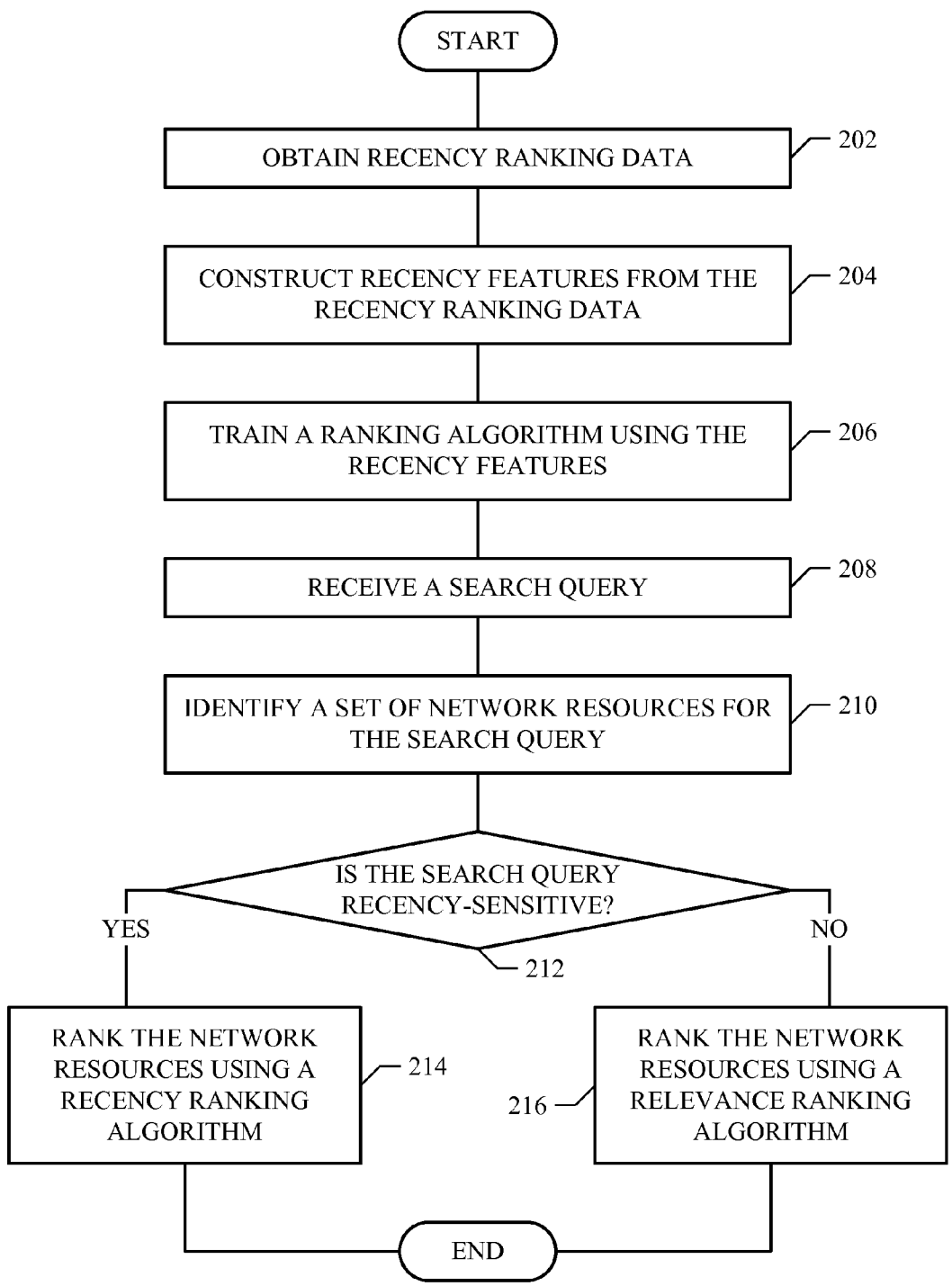
FIG. 2 illustrates an example method for incorporating the recency of the search queries or the network resources identified for the search queries when ranking the network resources.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A search engine is a computer-implemented tool designed to search for information relevant to specific subject matters or topics on a network, such as the Internet, the World Wide Web, or an Intranet. To conduct a search, a network user may issue a search query to the search engine. The search query, or simply "query", generally contains one or more words that describe a subject matter. In response, the search engine may identify one or more network resources, or simply "resources", that are likely to be related to the search query, which may collectively be referred to as a "search result" identified for the search query. The network resources are usually ranked and presented to the network user according to their relative degrees of relevance to the search query. For the purpose of clarification, hereafter, let q denote a search query, and let r denote a network resource. Note that a network resource, r, may have any suitable format (e.g., document, image, video, audio, web page, executable, blog post, news article, etc.).

Sophisticated search engines implement many other functionalities in addition to merely identifying the network resources as a part of the search process. For example, a search engine usually ranks the network resources identified for a search query according to their relative degrees of relevance with respect to the search query, such that the network resources that are relatively more relevant to the search query are ranked higher and consequently are presented to the network user before the network resources that are relatively less relevant to the search query. The search engine may also provide a short summary of each of the identified network resources.

FIG. 1 illustrates an example search result 100 that identifies five network resources and more specifically, five web pages 110, 120, 130, 140, 150. Search result 100 is generated in response to an example search query "President George Washington". Note that only five network resources are illustrated in order to simplify the discussion. In practice, a search result may identify hundreds, thousands, or even millions of network resources. Network resources 110, 120, 130, 140, 150 each includes a title 112, 122, 132, 142, 152, a short summary 114, 124, 134, 144, 154 that briefly describes the respective network resource, and a clickable link 116, 126, 136, 146, 156 in the form of a URL. For example, network resource 110 is a web page provided by WIKIPEDIA that contains information concerning George Washington. The URL of this particular web page is "en.wikipedia.org/wiki/George_Washington".

Network resources 110, 120, 130, 140, 150 are presented according to their relative degrees of relevance to search query "President George Washington". That is, network resource 110 is considered somewhat more relevant to search query "President George Washington" than network resource 120, which is in turn considered somewhat more relevant than network resource 130, and so on. Consequently, network resource 110 is presented first (i.e., at the top of search result 100) followed by network resource 120, network resource 130, and so on. To view any of network resource 110, 120, 130, 140, 150, the network user requesting the search may click on the individual URLs of the specific web pages.

In particular embodiments, the ranking of the network resources with respect to the search queries may be determined by a ranking algorithm or a ranking model implemented by the search engine. Within the context of the present disclosure, the two terms, "ranking algorithm" and "ranking model", refer to the same concept and are used interchangeably. Currently, given a search query and a set of network resources identified in response to the search query, a ranking algorithm ranks the network resources in the set according to their relative degrees of relevance with respect to the search query. More specifically, in particular embodiments, the network resources that are relatively more relevant to the search query are ranked higher than the network resources that are relatively less relevant to the search query, as illustrated, for example, in FIG. 1. For the purpose of clarification, such type of mostly relevance-based ranking model, which is currently implemented by most of the search engines, is hereafter referred to as "relevance ranking model" or "relevance ranking algorithm".

In particular embodiments, as a part of the ranking process, a ranking algorithm may determine a ranking score for each of the network resources in the set. For example, with a relevance ranking algorithm, the network resources that are relatively more relevant to the search query may receive relatively higher ranking scores than the network resources that are relatively less relevant to the search query. The network resources in the set are then ranked according to their respective ranking scores.

In particular embodiments, a ranking algorithm may be a mathematical algorithm or mathematical model trained using machined learning. Machine learning is a scientific discipline that is concerned with the design and development of algorithms that allow computers to learn based on data. The computational analysis of machine learning algorithms and their performance is a branch of theoretical computer science known as computational learning theory. The desired goal is to improve the algorithms through experience (e.g., by applying the data to the algorithms in order to "train" the algorithms). The data are thus often referred to as "training data". Examples of algorithm types may include supervised learning, unsupervised learning, semi-supervised learning, reinforcement learning, transduction, and learning to learn.

Typically, a machine learning algorithm is organized into a taxonomy based on the desired outcome of the algorithm and is trained by applying training data to the algorithm. The algorithm is adjusted (i.e., improved) based on how it responds to the training data. Often, multiple sets of training data may be applied to the same algorithm so that the algorithm may be repeatedly improved.

Machine learning may train computers to learn to perform certain functionalities. For example, an algorithm may be trained to predict outputs for inputs based on training inputs and training outputs. This type of algorithm of machine learning is known as transduction or transductive inference. To train such an algorithm, the training data may include training inputs and training outputs. The training outputs may be the desirable or correct outputs that should be predicted by the algorithm for the training inputs. By comparing the outputs actually predicted by the algorithm in response to the training inputs with the training outputs, the algorithm may be appropriately adjusted (i.e., improved) so that, in response to the training inputs, the algorithm predicts outputs that are the same as or similar to the training outputs. In particular embodiments, the type of training inputs and training outputs in the training data may be similar to the type of actual inputs and actual outputs to which the algorithm is to be applied.

In particular embodiments, a ranking algorithm implemented by a search engine may be such type of algorithm. The ranking algorithm may be trained using training data including or derived from training search queries and training search results. More specifically, various types of features created based on the training search queries and the training search results, which becomes a part of the training data, may be applied to the ranking algorithm being trained. The ranking algorithm is improved based on the data contained in these training features. In other words, the training features are applied to the ranking algorithm to improve the ranking algorithm's ability to correctly rank a set of network resources with respect to a search query. For example, to train a relevance ranking model, relevance features need to be used so that the relevance ranking model learns to rank the network resources according to relevance.

Given a search query and a set of network resources identified for the search query, currently, a ranking algorithm and more specifically, a relevance ranking algorithm, generally ranks the network resources according to their relative degrees of relevance with respect to the search query, as illustrated in FIG. 1. However, when determining the degrees of relevance, current relevance ranking algorithms focus mostly on topical relevance; that is, given a search query and a network resource, the current relevance ranking algorithms mainly consider how closely the content of the network resource relates to the subject matter described by the search query. Some current ranking algorithms may consider one or two types of non-topical factors. For example, a ranking algorithm may take into consideration the authoritativeness of the network resources during the ranking process. A network resource from a reputable or authoritative source may be ranked higher than a network resource from a disreputable or unknown source. A ranking algorithm may also take into consideration the popularity of the network resources (e.g., popularity among the network users as indicated by the number of clicks on or links to the network resources).

To improve upon the current ranking models that mainly focus on relevance, in particular embodiments, a ranking model may take into consideration the recency of the network resources during the ranking process. The recency of a network resource may indicate the "freshness" of the network resource (i.e., how recent or how up-to-date the network resource or the content of the network resource is, especially with respect to the search query to which the network resource corresponds), such as, for example, when is the network resource created and published, when is the network resource last updated or modified, when is the network resource included as a link in anther network resource, when is the network resource discovered by a search engine, etc. For the purpose of clarification, a ranking model that takes into consideration the recency of the network resources with respect to the search queries during the ranking process is hereafter referred to as "recency ranking model" or "recency ranking algorithm". Of course, a recency ranking algorithm may also take into consideration the relevance (e.g., in addition to the recency) of the network resources with respect to the search queries during the ranking process. In contrast, the currently existing relevance ranking models generally do not take into consideration the recency of the network resources during the ranking process, although they may take other characteristics of the network resources (e.g., authoritativeness or popularity) into consideration. Thus, a relevance ranking model does not necessarily rank the network resources solely based on the topic relevance of the network resources. It simply does not take the recency of the network resources into consideration during the ranking process.

Considering the recency of the network resources during the ranking process may be especially important for certain types of search queries, such as, for example, recency-sensitive or time-sensitive search queries (e.g., search queries relating to breaking news). On the one hand, some search queries have little or no connection with time. For example, search queries such as "President George Washington", "French red wine", or "Italian restaurants in San Francisco" describe subject matters that are continuously present with little or no change over time, and therefore are not time sensitive or time specific (i.e., time insensitive). On the other hand, some search queries (e.g., search queries relating to breaking news, trendy topics, popular gossips, etc.) may be recency or time sensitive or time specific (i.e., having a strong connection with or a strong tie to a particular time period). For example, search query "Hurricane Katrina" may be considered recency-sensitive around August and September of 2005; search queries "presidential election", "democratic primary", or "Barack Obama" may be considered recency-sensitive between late 2007 and early 2008; and search queries "AIG", "bailout bill", and "mortgage crisis" may be considered recency-sensitive around late 2008. For such recency-sensitive search queries, it may be especially important to take into consideration the recency of the network resources as well as their topic relevance during the ranking of the corresponding network resources.

Furthermore, these search queries may be only recency-sensitive during specific time periods, as suggested by the above example recency-sensitive queries. Once a particular time period has passed, a search query may no longer be considered recency-sensitive. For example, search queries "presidential election" and "democratic primary" may no longer be considered recency-sensitive after November 2008. As a result, the recency of a network resource may depends on the time sensitivity of the search query for which it is identified and to which it corresponds. For some search queries, their corresponding network resources may be time-sensitive for a few month or a year. For example, the network resources corresponding to the search query "presidential election" may be time-sensitive for about six months prior to the election date; and the network resources corresponding to the search query "WSDM conference" (referring to an international conference on Web Search and Data Mining held annually) may be time-sensitive for one year. For some search queries (e.g., search queries relating to breaking-news), their corresponding network resources may be time-sensitive for a few days or even a few hours. For example, the network resources corresponding to the search query "San Francisco earthquake" (referring to an earthquake happened in the San Francisco Bay Area) may be time-sensitive for a day (e.g., the day the earthquake happened).

To take the recency of the network resources into consideration when ranking search results for the recency-sensitive search queries, particular embodiments may train a recency ranking algorithm with recency features constructed based on recency-sensitive search queries and network resources, collectively referred to as "recency training data" or "recency ranking data". Of course, the recency ranking algorithm may also be trained with other types of features (e.g., relevance features) in addition to the recency features. Thereafter, the recency ranking algorithm (i.e., the ranking algorithm that has been trained with at least the recency features) may be used to rank the search results corresponding to the recency-sensitive search queries received at a search engine. Because the recency ranking algorithm has been trained with the recency features in addition to the other types of features, the recency ranking algorithm in effect takes into consideration the recency of the network resources and optionally other factors represented by the other types of features during the ranking process.

FIG. 2 illustrates an example method for training a recency ranking model via machine learning. Particular embodiments may train a recency ranking model used to rank the network resources identified for each recency-sensitive search query with recency training data either solely or in combination with other types of training data (e.g., relevance training data). Since the recency ranking model is trained at least with the recency training data, when this recency ranking model is subsequently used to rank the network resources identified for the recency-sensitive search queries, the ranking orders determined by the recency ranking model are implicitly based at least in part on the recency of the network resources; that is, the recency of the network resources are one of the factors that affect the ranking orders of the network resources. Thus, the ranking process takes into consideration the recency of the network resources.

In particular embodiments, the recency training data may include or may be derived from recency-sensitive search queries and the search results generated for and corresponding to the recency-sensitive search queries. In particular embodiments, a recency-sensitive search query is a search query that is time-sensitive or time-specific during a particular time period. For example, search queries relating to breaking-news (breaking-news search queries) are a common type of recency-sensitive search queries. In particular embodiments, the breaking-news search queries may be search queries relating to subject matters or topics that are in the news at the time when the search queries are issued to and received at search engines. Thus, a breaking-news search query is time-sensitive during the time period when the topic of the search query is in the news. As a result, there may be a "buzz" or a major influx of network contents relating to these topics at the time when the search queries are issued to the search engines. The actual events described by the breaking-news search queries may have just occurred at the time when the search queries are issued to the search engines or may have occurred a few days before the time when the search queries are issued to the search engines. In the latter case, if there is still significant news coverage for the events, then particular embodiments may still consider the search queries as breaking-news search queries.

Particular embodiments may obtain the recency training data by selecting from the search queries received at one or more search engines and the search results generated by the search engines those recency-sensitive search queries and their corresponding search results to form the recency training data (i.e., the training search queries and the training search results), as illustrated in step 202. In order to do so, particular embodiments may need to distinguish between recency-sensitive search queries and recency-insensitive search queries among all the search queries received at the search engines. That is, given a search query, particular embodiments may need to determine whether the search query is recency-sensitive or recency insensitive. Such process may be referred to as "recency classification" of the search queries.

Particular embodiments may employ an automatic recency classifier to determine whether a search query is recency-sensitive. Recency-sensitive search queries, due to their close ties to specific time periods, may exhibit temporal characteristics different from or lacking in recency-insensitive search queries. For example, when a topic is in the news, it tends to diverge from its regular temporal behavior as it, for example, may become more prominent in the search query stream, may be mentioned more often in news articles, and so on. Such temporal behavior may be the underlying assumption behind identifying breaking-news search queries.

One existing method for detecting topics in the news may involve tracking the frequencies of the topics over discrete time periods and detecting irregularities such as, for example, a large divergence from the mean number of occurrences or a sudden burst of activity during a particular time period.

In contrast, instead of modeling individual topics and tracking them over time, particular embodiments automatically detect recency-sensitive search queries by modeling each discrete time period (also referred to as "time slot"), hereafter denoted as t, and comparing the models representing different time periods. Particular embodiments may model each discrete time period, t, using various types of search-related activities occurred during that time period, such as, for example, the search queries received at the search engines and the network resources (e.g., news articles) published during that time slot. Each type of search-related activities may be represented using a different model. Particular embodiments may construct a suitable language model, such as an n-gram language model, which is a type of probabilistic model for predicting the next item in a sequence, to represent each type of search-related activities for each discrete time period. Thus, each discrete time period may be associated with one or more language models.

More specifically, particular embodiments may define various discrete time periods, and for each discrete time period, particular embodiments may collect the search-related activities occurred during that time period. For example, particular embodiments may collect the search queries received at the search engines during each time period or the network resources published or discovered by the search engines during each time period. For each discrete time period, t, one n-gram language model may be constructed to represent the search queries received at the search engines during that time period, hereafter denoted by $M_{Q,t}$; another n-gram language model may be constructed to represent the network resources published during that time period, hereafter denoted by $M_{R,t}$; and a third n-gram language model may be constructed to represent specifically those search queries received at the search engines during that time period that have news articles included in their corresponding search results (i.e., a search engine has specifically identified one or more news articles for such a search query; note that the search queries having news articles included in their search results are usually a subset of the search queries received at the search engines), hereafter denoted by $M_{Qnews,t}$. Other types of search-related activities occurred during each time period may also be represented by different language models.

To construct the language models representing the search queries, particular embodiments may consider each search query as a sentence. To construct the language models representing the network resource, particular embodiments may use the titles, headlines, keywords, or other sentences contained in the individual network resource.

As explained above, in general, a search query, q, is recency-sensitive with respect to a particular time period. In practice, the particular time period of concern is usually the time period during which the search query under analysis (e.g., q) is issued to and received at a search engine. Hereafter, for each search query under analysis, the time period during which the search query under analysis is received at a search engine (i.e., the time period with respect to which the search query under analysis may be considered recency-sensitive) is referred to as the "current time period" and denoted by $t_{current}$. Note that different search queries may have different corresponding current time periods as they are received at search engines at different times.

To identify whether a particular search query, q, is a recency-sensitive search query (e.g., a breaking-news search query) during its corresponding current time period, particular embodiments may compare its affinity to the models representing its corresponding current time period, $t_{current}$, with its affinity to models representing one or more other time periods prior to the current time periods, hereafter each being referred to as a "reference time period" and denoted by $t_{reference_i}$. Note that a reference time period is specifically with respect to a particular current time period. If the current time period changes (e.g., corresponding to a different search query under analysis), then the reference time slots may change accordingly.

There may be one or more reference time periods used for comparison with each current time period. For example, if the current time period represents the hour between 10:00 am and 11:00 am on the third Wednesday of a month, the reference time periods may include the previous hour of the same day (i.e., the hour between 9:00 am and 10:00 am on the same Wednesday), the same hour of the day during the previous day (i.e., the hour between 10:00 am and 11:00 am on the Tuesday before the Wednesday), the same hour of the same day during the previous week (i.e., the hour between 10:00 am and 11:00 am on the second Wednesday of the month), the same hour of the same day during the previous month (i.e., the hour between 10:00 am and 11:00 am on the third Wednesday of the previous month), and so on. In particular embodiments, the current time period and each of its reference time periods have the same or similar time span. For example, if the current time period spans across two hours, then each of its reference time periods may also span across two hours. Particular embodiments may select for a current time period one or more reference time periods that represent time periods similar to that represented by the current time period, such as same hours during different days, same day of different weeks or months, etc.

In particular embodiments, the current time period may have a language model that represents the search queries received at the search engines during the current time period, hereafter denoted by $M_{Q,t_{current}}$, a language model that represents the network resources published during the current time period, hereafter denoted by $M_{R,t_{current}}$, and a language model that represents specifically those search queries received at the search engines during the current time period that have news articles included in their search results, hereafter denoted as $M_{Q_{news},t_{current}}$. Similarly, each of the reference time periods may have a language model that represents the search queries received at the search engines during that reference time period, hereafter denoted by $M_{Q,t_{reference_i}}$, a language model that represents the network resources published during that reference time period, hereafter denoted as $M_{R,t_{reference_i}}$ and a language model that represents specifically those search queries received at the search engines during the reference time period that have news articles included in their search results, hereafter denoted as $M_{Q_{news},t_{reference_i}}$.

Optionally, particular embodiments may smooth the language models so that they may be used to estimate the likelihood not only of sentences that are used during their creation, but also unseen sentences that are similar to those sentences that are used during the creation of the language models. In particular embodiments, smoothing may be done using linear interpolation to a lower n-gram model.

Without smoothing, an n-gram language model may assign to an n-gram, $S_i$, consisting of n words, $S_i = \{w_1, \ldots, w_n\}$, the maximum likelihood probability may be defined as:

$$P(S_i) = \frac{\text{count}(S_i)}{\sum_j \text{count}(S_j)};$$

where $S_j$ is any n-gram of the same length as $S_i$. In this case, an n-gram that has never been observed receives the probability zero.

On the other hand, in a language model that is smoothed using linear interpolation, the same n-gram is assigned the probability $$P(S_i) = \lambda \frac{\text{count}(S_i)}{\sum_j \text{count}(S_j)} + (1-\lambda) \frac{\text{count}(S_i^*)}{\sum_j \text{count}(S_j^*)};$$

where:
(1) $S_i^* = \{w_1, \ldots, w_{n-1}\}$; that is, $S_i^*$ is the same as $S_j$ except for the last word, $w_n$, which is omitted; (2) $S_j^*$ is any n-gram of the same length as $S_i^*$; and (3) $\lambda$ is a smoothing parameter that is set using experiments. In this case, even if $S_i$ has not been observed, it may be assigned a non-zero probability, since the lower-order n-gram $S_i$ is more likely to have been observed.

For example, consider $S_i = \{\text{'michael', 'Jackson', 'conspiracy'}\}$. If this n-gram has not been observed during the time slot used to create one of the language models referenced above, the probability of this n-gram, $S_i$, may be zero unless the language model is smoothed. If the model is smoothed using linear interpolation, and the lower-model n-gram is observed as $S_i^* = \{\text{'michael', 'Jackson'}\}$ (this n-gram is more likely to be observed because it is shorter), then the probability of $S_i$ may be non-zero, resulting in a more accurate language model.

Based on the language models of the current time period and each of the reference time periods, particular embodiments may compute the generation likelihood of the search query under analysis, q, according to each of the language models of each of the time periods. For example, particular embodiments may compute: (1) the generation likelihood of the search query according to the search query model of the current time period, hereafter denoted as $P(q|M_{Q,t_{current}})$; (2) the generation likelihood of the search query according to the network resource model of the current time period, hereafter denoted as $P(q|M_{R,t_{current}})$; (3) the generation likelihood of the search query according to the model of the current time period that represents the search queries that have news articles in their search results, hereafter denoted as $P(q|M_{Q_{news},t_{current}})$; (4) the generation likelihood of the search query according to the search query model of each of the reference time periods, hereafter denoted as $P(q|M_{Q,t_{reference_i}})$ (5) the generation likelihood of the search query according to the network resource model of each of the reference time periods, hereafter denoted as $P(q|M_{R,t_{reference_i}})$ or (6) the generation likelihood of the search query according to the according to the model of each of the reference time periods that represents the search queries that have news articles in their search results, hereafter denoted as $P(q|M_{Q_{news}\ reference_i})$.

By selecting the reference time periods to have the same or similar time span as the current time period, particular embodiments may minimize the differences in the generation likelihood values stemming from model estimation parameters. Note that it is not necessary for all types of language models to be constructed for each time periods. Particular embodiments may use different combinations of the types of language models or may use only a single type of language model. The generation likelihood values for each time period may be computed using the available types of language models. Furthermore, the generation likelihood values for each time period may be computed using any suitable formulas.

Particular embodiments may then compute the "buzziness" (i.e., how popular or how much interest there is) of the search query under analysis, q, according to the various language models (e.g., search query model or network resource model) constructed for the different time periods.

In particular embodiments, for the current time period, the buzz value of q according to the search query models may be computed as:

$$\text{buzz}(q|Q,t_{current}) = \max_i(\log P(q|M_{Q,t_{current}}) - \log P(q|M_{Q,t_{reference_i}}));$$

the buzz value of q according to the network resource models may be computed as:

$$\text{buzz}(q|R,t_{current}) = \max_i(\log P(q|M_{R,t_{current}}) - \log P(q|M_{R,t_{reference_i}}));$$

and the buzz value of q according to the models representing the search queries that have news articles in their search results may be computed as:

$$\text{buzz}(q|Q_{news},t_{current}) = \max_i(\log P(q|M_{Q_{news},t_{current}}) - \log P(q|M_{Q_{news},t_{reference_i}})).$$

In particular embodiments, the individual buzz values (i.e., the buzz values of q according to the various language models) may then be combined to compute a final buzz value of q with respect to the current time period, as:

$$\text{buzz}(q|t_{current}) = \lambda \times \text{buzz}(q|Q,t_{current}) + \gamma \times \text{buzz}(q|R,t_{current}) + (1-\lambda-\gamma)\text{buzz}(q|Q_{news},t_{current});$$

where $\lambda$ and $\gamma$ are values between 0 and 1 and $\lambda+\gamma \leq 1$.

Alternatively, in particular embodiments, the final buzz value of q with respect to the current time period may be computed based on the individual buzz values as:

$$\text{buzz}(q|t_{current}) = \lambda \times \text{buzz}(q|Q,t_{current}) + (1-\lambda) \times \text{buzz}(q|R,t_{current}) + \text{boost}(Q_{news},t_{current});$$

where $\lambda$ is a value between 0 and 1, and $\text{boost}(Q_{news},t_{current})$ is a constant, c, if search query q appears in $Q_{news},t_{current}$ and zero otherwise.

Particular embodiments may consider the search query q as recency-sensitive (e.g., a breaking-news search query) if its final buzz value (as computed using any suitable method) exceeds a predetermined threshold, k.

The values of $\lambda$, $\gamma$, and k may be determined based on experimental data. To obtain optimal $\lambda$, $\gamma$, and k values, particular embodiments may collect manual judgments (i.e., judgments given by human judges) for a sufficiently large set of search queries (e.g., a set of 2000 search queries) over several days. Within each day, the human judges may be presented with the search queries received at the search engines during that day and asked to determine whether these search queries refer to an upcoming, ongoing, or very recent event, for which the search-engine users may prefer recent, up-to-date content. The search queries may be judged on the same day they are received and collected. The human judges may be instructed that not every search query that has an increase in volume is a breaking-news search query. For example, following a death of an actor, there is typically some renewed interest in movies featuring that actor. Such search queries about the movies, in contrast to the search queries about the actor himself, probably should not be judged as breaking-news search queries as the users issuing the search queries are not likely to benefit from the more recent network resources. Particular embodiments may choose the $\lambda$, $\gamma$, and k values to maximize the accuracy of $\text{buzz}(q|t_{current})$ over this human-judged set.

In general, for a search query received at a search engine, the search engine may identify one or more network resources that may be relevant to the search query. The search query and each of the network resources identified for the search query may form a query-resource pair. Since each network resource is associated with a unique URL that identifies the location of the network resource, the network resource may be uniquely identified and represented by its associated URL. Hereafter, let ⟨q, r⟩ denote a query-resource pair. If the network resource is identified by its URL, then a query-resource pair may also be referred to as a query-URL pair and denoted by ⟨q, url⟩.

The automatic recency classifier enables particular embodiments to select from the search queries received at the search engines specifically those search queries that are recency-sensitive to form the recency training data. For each search query that has been classified as recency-sensitive (e.g., by the automatic recency classifier), particular embodiments may collected a predetermined number (e.g., 20 to 30) top-ranked network resources identified by the search engine for the recency-sensitive search query. The recency-sensitive search query and each of its top-ranked network resources may form a recency-sensitive query-resource pair. These recency-sensitive query-resource pairs may become a part of the recency training data. Particular embodiments may collect the recency-sensitive search queries and their top-ranked network resources periodically (e.g., during different time periods) and from different search engines to form the recency-sensitive query-resource pairs included in the recency training data, which may prevent the recency training data from being biased toward specific periods of time.

In particular embodiments, the recency training data may include additional information than merely the recency-sensitive query-resource pairs. Collecting the recency training data may be different from collecting other types of training data, such as relevance training data, due to the time-sensitive nature of the recency training data. For example, with the relevance training data, the relevance judgment for a recency-insensitive query-resource pair is usually static over time because network resource freshness (i.e., the recency of the network resource) generally does not affect the degree of relevance the network resource has with respect to the corresponding search query and consequently does not affect the user satisfaction in the ranking of the search results. The judgment for a recency-sensitive query-resource pair, however, may need to incorporate the freshness of the network resource. For example, the epidemic swine flu was first identified around April 2009. For the search query "swine flu" received at a search engine in April 2009, the network resource containing a news article reporting the identification of this epidemic may be ranked relatively high among the network resources identified for the search query "swine flu". A week later, this news article may become outdated as there have been many more news articles reporting the latest status and development of the epidemic beyond its initial identification. Consequently, the older, outdated news article may be ranked relatively lower if the search query "swine flu" or a similar search query is again received at the search engine a week later. Thus, for each recency-sensitive search query, the time the search query is issued to and received at a search engine, hereafter denoted by $t_q$, may need to be collected in addition to the recency-sensitive query-resource pairs. A recency-sensitive query-resource pair may be represented by a tuple as ⟨q, r, $t_q$⟩, or ⟨q, url, $t_q$⟩ when the resource is represented by its URL.

Particular embodiments may employ human editors to judge the collected recency-sensitive query-resource pairs. For each recency-sensitive query-resource pair, particular embodiments may ask a human editor to judge how good the network resource is with respect to the corresponding search query. Particular embodiments may have the human editors to judge the recency-sensitive query-resource pairs immediately or shortly after they are collected to ensure that the human judgment is sufficiently reliable.

For the human judgments, particular embodiments may define a set of judgment grades and ask the human editors to grade each recency-sensitive query-resource pair using the predefined judgment grades. For example, the judgment grades may be: perfect, excellent, good, fair, and bad. In particular embodiments, for each recency-sensitive query-resource pair, the human editor may be asked to first grade the pair based on non-temporal relevance (i.e., without considering the recency of the search query or the network resource), such as intent, usefulness, content, user interface design, domain authority, etc., and then adjust the initial grade solely based on the recency of the network resource.

In particular embodiments, an initial grade (i.e., the grade based on non-temporal relevance) given to a recency-sensitive query-resource pair may receive a demotion if the date of the network resource or the age of the content contained in the network resource makes the network resource less relevant in comparison to more recent material or due to changes in time, which may alter the context of the search query. For example, suppose there is an on-going crisis of an airplane being hijacked. For a search query relating to the airplane hijack, a first news article reporting the initial hijack, which may be a week old, may be demoted as it no longer reports the most current information on the hijack event despite the fact that the content of the first news article may be closely related (i.e., very relevant) to the search query. In particular embodiments, the grade demotion may be reflected in the following judgment options: (1) shallow demotion (one-grade demotion): if the network resource is somewhat outdated, it may be demoted by one grade (e.g., from excellent to good); and (2) deep demotion (two-grade demotion): if the network resource is very outdated or completely useless, it may be demoted by two grades (e.g., from excellent to fair).

On other hand, an initial grade given to a recency-sensitive query-resource pair may receive a promotion if the date of the network resource or the age of the content contained in the network resource makes the network resource more relevant in comparison to the less recent materials. In the above airplane hijack example, again, for a search query relating to the airplane hijack, a second news article reporting the currently on-going negotiation process with the hijackers, which may be only a few hours old at the time the search query is received at the search engine, may be promoted as it has the latest information on the hijack event, even if the second news article may also contain other news stories unrelated to the hijack event and thus may be considered as less relevant to the search query. In particular embodiments, the grade promotion may be reflected in the following judgment options: (1) shallow promotion (one-grade promotion): if the network resource is somewhat current, it may be promoted by one grade (e.g., from good to excellent); and (2) deep promotion (two-grade promotion): if the network resource is very current or contains the latest information, it may be promoted by two grades (e.g., from good to perfect).

The advantages of this recency-demotion/promotion grading method may include: (1) recency is incorporated into the overall relevance so that the ranking-algorithm learning problem may be formulated as the optimization of a single objective function; and (2) recency may be decoupled from the overall relevance so that recency and non-recency relevance may be analyzed separately during ranking-algorithm machine learning. On the other hand, a potential problem of the recency-demotion/promotion grading method may be that shallow demotion or promotion and deep demotion or promotion may not demote or promote time-sensitive network resources to the most appropriate extent. It is thus possible that the recency demotion or promotion may be biased in the overall relevance judgment (i.e., the recency demotion or promotion may be either too aggressive for some recency-sensitive query-resource pairs or too conservative for some other recency-sensitive query-resource pairs). However, experiments indicate that the above judgment guideline is appropriate for most recency-sensitive query-resource pairs. Furthermore, such a judgment guideline by one-grade or two-grade demotion or promotion is the most straightforward for the human editors, whose judging needs to be efficient and may be somewhat error-prone.

Similar to a recency-sensitive search query, the recency-sensitivity of a network resource means that the network resource has a specific time aspect to it, which may be related to, for example, news, recurrent events, blogs, buzz queries, etc; otherwise, it may be considered as a recency-insensitive network resource. Experiments indicate that approximately 34.6% of the collected network resources are considered to be recency-sensitive.

In addition to the grade given to each recency-sensitive query-resource pair, particular embodiments may also ask the human editor to provide a timestamp for the network resource that represents the time aspect of the network resource. Hereafter, let $t_r$ the timestamp given to a network resource. In particular embodiments, the timestamp given to a network resource, $t_r$, may be the date the main content contained in the network resource is created, published, or last modified, or the date the network resource is linked in another network resource, or the date the network resources is discovered by a search engine. There may be different information sources form which to determine the timestamp for a network resource. For example, content-based evidence and link-based evidence may be used to determine the timestamps for the network resources. Content-based evidence means that a timestamp may be extracted from the content of a network resource. However, most network resources do not contain a timestamp. Link-based evidence means that the resource discovery time based on the link relationship on the web may be utilized. However, in most cases, resource discovery time may not equal to resource creation time.

The age of a network resource, which may computed using the timestamp of the network resource provided by the human editor, is an objective measurement of the recency of the network resource, while recency demotion or promotion is a subjective judgment by a human about the recency of the network resource. One experiment indicates that among 1,888 recency-sensitive network resources having timestamps provided by the human editors, 95 are demoted with two grades, 534 are demoted with one grade, and 1,259 are not demoted. The distributions of the network resources with different ages at different recency demotion levels indicate that most of the non-demoted network resources have ages within 10 days, most of the one-grade-demoted network resources have ages within 60 days, and most of the two-grade-demoted network resources have older ages. This observation is generally consistent with the expectation that overall, non-demoted network resources have younger ages than demoted network resources. The network resources that are several days old have the highest frequencies, while there are fewer fresher network resources such as those created within two days, which suggests that there are more recency-sensitive search queries that are related to the news that happened several days ago than those that happened within two days. At the same time, the search engine's crawler may not fully discover the most-recent network contents, which may also be a factor for this observation.

In particular embodiments, the recency of a network resource with respect to a search query may be represented by the time difference between the timestamp provided by the human editor to the network resource, $t_r$, and the time the search query is received at a search engine, $t_q$, as $\Delta t = t_q - t_r$.

Based on the recency-sensitive search queries and their corresponding search results as well as the information associated with the recency-sensitive search queries and search results (e.g., query-resource pairs, time stamps, judgment grades, etc.), particular embodiments may construct one or more recency features, as illustrated in step 204. To better represent the recency of the network resources using the available information, particular embodiments may construct multiple types of recency features, such as, for example and without limitation, timestamp features, link-time features, web-buzz features, click-buzz features, etc. Although each type of the recency features, individually, may not directly and accurately represent the network resource freshness, they do provide useful evidence. At the ranking model learning stage, these different types of potentially weak and discriminate recency features may be combined together to better represent the network resources' freshness. In addition, particular embodiments may construct various types of features that, while not precisely recency features, are nevertheless closely related to the network resource recency, such as, for example and without limitation, resource-classification features, etc. Such types of features may be useful in training the ranking model in terms of, for example, helping machine learning use recency features appropriately for different classes of network resources.

In particular embodiments, the features may be constructed from each recency-sensitive query-resource pair where the search query has a timestamp, $t_q$, that represents the time the recency-sensitive search query is received at a search engine. To simplify the discussion, each type of features is explained in more detail with respect to one recency-sensitive query-resource pair $\langle q, r, t_q \rangle$.

In particular embodiments, the timestamp features are the time values extracted from the content of each network resource corresponding to a recency-sensitive search query. The timestamp features may be especially useful for news articles (e.g., web pages containing news articles), which often contain timestamps in some common formats. There may be different ways to extract the timestamp from the content of a network resource. Given a network resource (e.g., a network document such as a web page), particular embodiments may detect timestamps in common formats using regular expressions, including, for example and without limitation: (1) numeric date formats such as MM/DD/YYYY, DD/MM/YYYY, YYYY/MM/DD, YYYY/DD/MM, YYYY/MM, MM/YYYY, or YYYY (e.g. "09/11/2001" or "2001-9-1", "11-2005", or "2005"; particular embodiments may ignore dates that have a two-digit year, such as "11/5/05"); (2) long date formats (i.e., date spelled out in words; e.g., 1st Oct 07, 1 December 2007, Jan 2nd 2008, or Feb 2 06).

Sometimes, multiple timestamps (e.g., dates) may be detected from a network document. In such cases, particular embodiments may compute the statistics of these timestamps in an attempt to reflect document freshness from different facets, including, for example and without limitation, the count of timestamps, the first timestamp (in word-view order in the document), the minimal timestamp (corresponding to the oldest date in the document), the maximal timestamp (corresponding to the newest date in the document), the mean and standard deviation of the timestamps, etc.

For each network resource, particular embodiments may then calculate one or more timestamp features, which may represent the age of the network resource, based on the one or more timestamps extracted from the content of the network resource. For example, if only a single timestamp is extracted from the content of a network document, the document age feature may be the difference between the timestamp of the network document and the time that the corresponding search query is received at a search engine (i.e., $t_q$). If there are multiple timestamps extracted from the content of a network document, for each timestamp statistic (except the standard deviation), particular embodiments may compute a different document age feature as the difference between the timestamp statistic and $t_q$.

In particular embodiments, the link-time features may be extracted from a link-based resource discovery log to provide resource freshness evidence. Whenever a link on a network resource is discovered, the network system (e.g., a server) may record the time of this discovery with the inbound URL. The link is coded as external or internal, depending on whether outbound URL and inbound URL are from the same domain.

Similar to timestamp features, particular embodiments may compute the statistics of the link times for the URL of a network resource, including, for example and without limitation, count, minimum, maximum, mean, and standard deviation. As external links usually provide more reliable signals than internal links, particular embodiments may also compute the same set of discovery time statistics based on external links only. The resource age features may then be computed by using the time the search query corresponding to the network resource is received at the search engine, $t_q$. In particular embodiments, each link-time feature of a recency-sensitive query-resource pair may be the difference between a particular link-time statistic and $t_q$.

It is possible that the link-time features may not represent the network resource freshness very accurately. For example, a link may be discovered a long time after the inbound network resource is created depending on the crawling capability and the crawling algorithm implemented by a search engine. On the other hand, link-time features may provide strong evidence of the network resource freshness. For example, if the discovery time of a network resource is three years ago, it may be deduced that the network resource is at least three years old (i.e., probably not very recent).

In particular embodiments, web-buzz is a feature extraction algorithm that detects recently popular (including new) URLs almost instantly as the crawler fetches new network resources continuously. This idea is similar to web page and link activity used in the T-Rank algorithm. It works by mining data from the crawler, where each target URL's in-link structure, diversity, and recency, etc. are extracted and URLs are selected based on these features. There are simple yet efficient techniques for avoiding spam and low-quality URLs. Thus, the buzzing URLs so identified are generally of good quality. Particular embodiments may index the resulting features with little latency. Consequently, the output features may contain valuable recency information.

For web-buzz features, particular embodiments may have three main output features: one composite buzz score that represents the intensity of web buzz, and two date features that allow for web buzz expiration with one date feature indicating the time of web buzz and the other date feature indicating a trust-weighted in-link discovery time. Other suitable types of web-buzz features may also be used.

In particular embodiments, the click-buzz feature is intended to identify whether a network resource, a website, or a network host is currently receiving an unusual level of attention from the network users compared to the past. Measure of attention may be the number of clicks on the network resource, on the query-resource pair, on the host, on the website, etc.

Using the number of clicks on a query-resource pair as an example, let $C_{t_i}$ denote the number of clicks on a query-resource pair during a particular time period, $t_i$. Note that each time period may be an hour, a few hours, a day, a week, etc. First, particular embodiments may compute the average and the variance of the statistic of interest in the query-resource pair over a number of time periods. Suppose there are $n_t$ time periods. The average of the statistic of interest over $n_t$ time periods may be computed as:

$$\bar{c}_{n_t} = \frac{1}{n_t} \sum_{i=1}^{n_t} c_{t_i};$$

and the variance of the statistic of interest over $n_t$ time periods may be computed as:

$$\text{var}(c) = \sigma_{n_t}^2(c) = \frac{1}{n_t} \sum_{i=1}^{n_t} (c_{t_i} - \bar{c}_{n_t})^2.$$

Then, the buzz level of the query-resource pair during a particular time period $t_i$ may be defined as the standard deviation from the mean during that time period as:

$$buzz_{t_i} = \frac{c_{t_i} - \bar{c}_{n_t}}{\sigma_{n_t}(c)}.$$

Experiments indicate that a value of $buzz_{t_i}$ greater than 3 may suggest a number of clicks during time period $t_i$ that is much above what may normally be expected with respect to past behavior.

Resource-classification features may not be considered as time-related features, but they may be helpful for recency boosting. For example, if a network resource is classified as a news article (more specifically, a web page containing a news article), and other recency features associated with this network resource imply that this news article is very old, the ranking score of this network resource should probably be demoted. Particular embodiments may provide these resource-classification features to the recency ranking algorithm during the machine learning process, which may be expected to learn such rules automatically. Particular embodiments may use three resource-classification features for each network resource: news page confidence, blog page confidence, and resource quality confidence. The confidence values may be computed based on the content of the network resources. The news page confidence may indicate the likelihood that a network resource is a news article. The blog page confidence may indicate the likelihood that a network resource is a blog entry. The resource quality confidence may indicate the quality of a network resource with respect to the corresponding search query.

Note that there may be missing feature values for some network resources. For example, a network resource may not contain a timestamp so that its timestamp features are invalid. In this case, particular embodiments may assign a default constant value to the missing feature. For the invalid resource feature, particular embodiments may set a very large positive constant value (e.g., 10,000,000 days) to it. A caveat is that the constant value zero or a small value cannot be used as default values for resource age features because zero or small values mean that the resources are very fresh, which may mislead the machine learning of the ranking algorithm for recency improvement.

Once the recency features and other related types of features are constructed, particular embodiments may apply these features to a ranking algorithm to train the ranking algorithm using machine learning, as illustrated in 206. The ranking algorithm trained with recency features will take recency of the network resources into consideration when used subsequently to rank other search results (i.e., a recency ranking algorithm). Of course, the recency features may not be the only types of features used to train the ranking algorithm. In particular embodiments, the recency features are used together other types of features (e.g., relevance features, authority features, etc.) to train the ranking algorithm.

There are different ways to train a recency ranking algorithm so that it takes recency of the network resources into consideration when ranking the search results. Particular embodiments may have a dedicated recency ranking algorithm that is trained using only recency training data (i.e., recency features). One challenge faced by this dedicated recency ranking approach is to collect sufficient recency training data in order to train the dedicated recency ranking algorithm because collecting recency training data is often costly and time-consuming. On the other hand, without sufficient recency training data (i.e., a sufficiently large number of recency features), a dedicated recency ranking algorithm will not be able to produce satisfactory ranking results since the quality of the training data directly affects the quality of the performance of the ranking algorithm, as with any type of machine learning applications.

Currently, search engines usually implement some form of ranking algorithms that are trained using mostly relevance training data. As indicated above, in the context of the present disclosure, existing ranking algorithms trained using mostly relevance training data are referred to as "relevance ranking algorithm" or "relevance ranking model". A relevance ranking model is not trained with any recency or recency-related features.

Because relevance training data (e.g., relevance features representing the degrees of relevance of the network resources with respect to their corresponding search queries) have been used to train existing relevance ranking algorithms for quite some time, there is a large amount of relevance training data and the relevance ranking algorithms trained using these relevance training data generally performance fairly well when ranking the search results based mainly on relevance. Particular embodiments may take advantage of the existing, well-trained relevance ranking algorithms and incorporate the recency features into a relevance ranking algorithm so that the resulting ranking algorithm takes into consideration both the relevance and the recency of the network resources during the ranking process. A relevance ranking algorithm thus trained with recency or recency-related features in effect becomes a recency ranking algorithm. Note that a recency ranking algorithm may also take into consideration other types of characteristics of the network resources (e.g., the relevance of the network resources) when ranking the network resources with respect to their corresponding search queries. In other words, recency of the network resources may only be some of the characteristics, but not necessarily all of the characteristics of the network resources taken into consideration by a recency ranking algorithm during the ranking process.

Recency ranking data (e.g., the data used to construct the recency features) and relevance ranking data (e.g., the data used to construct the relevance features) may be different in at least three aspects. First, the difference is in the ranking data themselves. With recency ranking data, the search queries are only those that are recency-sensitive (e.g., as determined by the automatic recency classifier). With relevancy ranking data, the search queries may be any search queries regardless of whether they are recency-sensitive. Second, the difference is in the features constructed based on the ranking data. With relevance ranking data, there is no valid or accurate recency feature values. For example, at the time the relevance ranking data are collected, the time the search queries are received at the search engines may not be accurately recorded. Consequently, the recency of the network resources identified for the search queries may not be calculated accurately. Third, the difference is in the judgments provided by the human judges to the query-resource pairs. With recency ranking data, the human judgments are obtained based on the recency demotion-promotion guidelines described above. With relevance ranking data, the human judgments are obtained using a different set of guidelines that usually treat recency criteria differently. For example, some relevance judgments may take recency into account but recency demotion or promotion is neither consistently nor explicitly applied as done for recency training data.

Nevertheless, despite the fact that relevance ranking data differ from recency ranking data, they may still be a useful information source that may help learn a recency ranking model because they represent the overall relevance of the network resources with respect to their corresponding search queries, which may also be the primary objective for the recency ranking models. Furthermore, the amount of relevance ranking data is much larger than recency ranking data, which implies that the overall relevance of the ranking model derived from the relevance ranking data should be much better than that derived from only the recency ranking data. Therefore, the information provided by the relevance ranking data may be utilized to improve the overall relevance of a recency ranking model.

There may be various ways to incorporate relevance information (i.e., relevance features) into the learning framework to train a recency ranking model so that the freshness of the ranking results may be improved while preserving the relevance performance of the recency ranking model. Some of the learning approaches are explained below using GBrank algorithm as an example for recency ranking model learning.

GBrank is often considered as one of the most effective learning-to-rank algorithms. Briefly, the basic idea of GBrank is that, for each preference pair $\langle x, y \rangle$ (e.g., x and y may each represent a network resource identified for the same search query) in the available preference set $S=\{\langle x_i, y_i \rangle | x_i \succ y_i, \forall i=1, 2, \ldots, N\}$ (here S is the training data applied to the ranking model and includes N preference pairs), x should be ranked higher than y by the ranking model. With GBrank algorithm, the problem of learning ranking functions is to compute a ranking function R, such that R matches the set of preference pairs S (i.e., $R(x_i) \geq R(y_i)$ if $x_i \succ y_i$, $\forall i=1, 2, \ldots, N$) as much as possible. The following loss function may be used to measure the risk of a given ranking function R:

$$l(R) = \frac{1}{2}\sum_{i=1}^{N} (\max\{0, R(y_i) - R(x_i) + \tau\}^2);$$

where $\tau$ is the margin between the two network resources in the pair (e.g., $\langle x_i, y_i \rangle$). To minimize the loss function l(R), R(x) has to be larger than R(y) with the margin $\tau$, which may be chosen to be a constant value or as a value varying with the network resource pairs. When pair-wise judgments are extracted from the human editors' labels with different grades, pair-wise judgments may include grade difference, which can further be used as the margin, $\tau$.

First, particular embodiments may employ a compositional model approach to combining recency features and relevance features when learning a recency ranking model. The relevance ranking of the current relevance ranking model derived from the relevance ranking data is already good. One way to exploit this relevance ranking model is to use its output ranking scores as an additional type of features during the learning of the recency ranking model. More specifically, in particular embodiments, the training data used for recency ranking model learning is still recency ranking data, while the features applied to the recency ranking model include the recency features constructed from the recency ranking data plus the ranking scores determined by a learned relevance ranking model. As the output, learned ranking model consists of another model's output (i.e., the output of the learned relevance ranking model), this model may be referred to as a "compositional model". In this case, the recency ranking model uses the output of the learned relevance ranking model, which captures the relevance information of the query-resource pairs contained in the ranking training data. At the same time, the feature dimensionality is significantly reduced so that the over-fitting problem may be expected to be alleviated. In terms of efficiency, compositional model training is fast because the training data size has relatively small and the feature dimensionality is low.

To further explain the compositional model approach, suppose a set of recency training data includes a number of recency-sensitive query-resource pairs together with the timestamps associated with the search queries and the network resources as well as the human judgments given to the query-resource pairs. A set of recency or recency-related features may be constructed from the set of recency training data, as explained above in connection with step 204. In addition, a learned relevance ranking algorithm may be used to determine a relevance ranking score for each recency-sensitive query-resource pair in the set of recency training data. The ranking scores for all the recency-sensitive query-resource pairs may provide another set of features (i.e., a set of relevance based features). The two sets of features (i.e., the recency features and the relevance features) may be combined together and applied to a recency ranking algorithm to train the recency ranking algorithm.

Second, particular embodiments may employ an over-weighting model approach when learning a recency ranking model, which combines relevance ranking data and recency ranking data together as training data, and empirically determines the relative weights for these two sets of data. The motivation for the over-weighting model approach is to leverage all available ranking data. While the grading guideline for the relevance ranking data is different from the recency demotion-promotion guideline for the recency ranking data, this approach may attempt to over-weigh recency ranking data so that ranking freshness is emphasized while good relevance is kept.

In particular embodiments, the feature set for the over-weighting model consists of both relevance features and recency features. As there is sufficient training data, especially with the inclusion of the relevance ranking data and the relevance features, the ranking model learning algorithm may pick up discriminate features without much over-fitting caused by high feature dimensionality. When combining recency preference pairs and relevance preference pairs, particular embodiments may use different relative weights for these two training data sources. The loss function then becomes:

$$l(R) = \frac{w}{N_{recency}} \sum_{\langle x_i, y_i \rangle \in D_{recency}} (\max\{0, R(y_i) - R(x_i) + \tau\}^2) +$$

$$\frac{1-w}{N_{relevance}} \sum_{\langle x_i, y_i \rangle \in D_{relevance}} (\max\{0, R(y_i) - R(x_i) + \tau\}^2);$$

where w may be used to control the relative weights between the recency training data and the relevance training data; $D_{recency}$ is the recency training data; $N_{recency}$ is the number of recency preference pairs of search query and network resource in $D_{recency}$; $D_{relevance}$ is the relevance training data; and $N_{relevance}$ is the number of relevance preference pairs of search query and network resource in $D_{relevance}$.

Third, particular embodiments may employ an adaptation model approach when learning a recency ranking model. Tree adaptation modeling aims to utilize the training data from one major network search domain (e.g., generic relevance ranking) to help train a ranking algorithm for a specific search domain that has insufficient training data (e.g., special recency ranking). In particular embodiments, regression trees, which form the base ranking model, may first be trained using the generic relevance ranking data. The base ranking model may then be modified according to the relatively small amount of recency ranking data.

More specifically, in particular embodiments, a ranking model may contain multiple binary decision trees. Each binary decision tree may have two or more levels, including a root level, a leaf level, and zero or more intermediate levels. Each non-leaf node in the binary decision trees may represent a threshold of a particular feature. Each leaf node in the binary decision trees may represent a score value. To determine a ranking score for a network resource with respect to a corresponding search query, the network resource is analyzed against each of the binary decision trees. In effect, the network resource traverses along each binary decision tree, starting at the root node of the tree. At each non-leaf node, the network resource is analyzed with respect to the feature represented by that non-leaf node to determine whether the network resource satisfies the corresponding threshold value of the feature. Depending on whether the network resource satisfies the corresponding threshold value of the feature, the tree traversal proceeds to the left or the right child node of that non-leaf node, until reaching one of the leaf nodes of the binary decision tree. The score value represented by the destination leaf node is the score value for the network resource associated with this particular binary decision tree. The final ranking score for the network resource may be the sum of all the score values obtained by traversing the network resource along all the binary decision trees in the ranking model.

Particular embodiments may modify the binary decision trees representing a learned relevance ranking model (i.e., the base ranking model) so that the relevance ranking model takes recency of the network resources into consideration during the ranking process and thus becomes a recency ranking model. Several types of modifications may be made on the base ranking model. For example, the splitting threshold value of the feature represented by a non-leaf node in a binary decision tree may be changed, which affects whether the tree traversal of a network resource proceeds to the left or the right child node of the modified non-leaf node and in turn affects the ranking score of the network resource, because the tree traversal of the network resource may arrive at a different leaf node and thus having a different score associated with this particular binary decision tree.

In addition or alternatively, the response value of a decision tree may be changed. That is, the score represented by a leaf node in a binary decision tree may be changed. As a result, any network resource whose tree traversal arrives at this leaf node may have a ranking score different from that determined by the base (i.e., unmodified) ranking model.

In addition or alternatively, new binary decision trees may be appended to the base ranking model. The non-leaf nodes of these new binary decision trees may be used to represent various recency or recency-related features. When determining a ranking score for a network resource, the network resource is analyzed against (i.e., traversing) the new binary decision trees as well as the existing binary decision trees. The final ranking score of the network resource thus also includes the scores represented by the destination leaf nodes of the new binary decision trees.

The assumption behind the adaptation approach is that the relevance ranking features may be correctly captured using the relevance ranking data, and they do not change much from one domain (e.g., the relevance domain) to another (e.g., the recency domain). However, some details need to be adapted to the new recency ranking data. This assumption is sound in the present case as the recency-sensitive search queries are a special type of search queries, which also bear the characteristics common among all search queries (e.g., relevance). Therefore, the base ranking model may naturally be used (after adaptation) for these recency-sensitive search queries.

Adaptation also allows particular embodiments to avoid the problem of insufficient recency training data. In practice, there usually are a large amount of relevance ranking data, but much less recency ranking data. Using only the small amount of recency ranking data to learn a recency ranking model would result in a poor recency ranking model. Adaptation may solve this insufficient training data problem by exploiting a base ranking model already trained on a large set of data (e.g., a learned relevance ranking model).

Particular embodiments may use GBrank as the base ranking model. Particular embodiments may use pair-wise preference data to adapt the base ranking model. This adaptation process tries to optimize the ranking order so as to approach the correct ranking order as much as possible. It uses a loss function, which is defined on the wrongly ordered network resource pairs. The goal of the adaptation process is to minimize the loss function. This process may use any available pair-wise training data such as, for example, query-resource pairs judged by human editors and click preference data from the network users.

The following table summarizes the different modeling approaches discussed thus far according to particular embodiments:

| Model | Data | Feature | Algorithm |
|---|---|---|---|
| dedicated model | $D_{recency}$ | $F_{recency}$ & $F_{relevance}$ | GBrank |
| compositional model | $D_{recency}$ | $F_{recency}$ & ranking scores determined by relevance model | GBrank |
| over-weight model | $D_{recency}$ & $D_{relevance}$ | $F_{recency}$ & $F_{relevance}$ | GBrank |
| adaptation model | $D_{recency}$ | $F_{recency}$ | adaptation |

For the learning process of a ranking model, particular embodiments may use discounted cumulative gain (DCG) to evaluate the quality of the ranking model, which may be defined as:

$$DCG_n = \sum_{i=1}^{n} \frac{G_i}{\log_2(i+1)};$$

where $i$ is the position in the document list; and $G_i$ is the function of relevance grade.

Another metric that may be used is normalized discounted cumulative gain (NDCG), which may be defined as:

$$NDCG_n = Z_n \sum_{i=1}^{n} \frac{G_i}{\log_2(i+1)};$$

where $Z_n$ is a normalization factor used to make the NDCG of an ideal list be 1. One example implementation may use $NDCG_1$ and $NDCG_5$ to evaluate the ranking results and relative $DCG_5$ gain to compare the two ranking results.

In particular embodiments, for different data sets, DCG values may be computed based on different judging guidelines. The following table illustrates a few example judging guidelines for DCG evaluations:

| | |
|---|---|
| $DCG_{relevance}$ | On relevance ranking data, represents overall relevance but recency is neither consistently taken into consideration nor decoupled from non-recency relevance. |
| $DCG_{nodemote}$ and $DCG_{nopromote}$ | On recency ranking data, represents non-recency relevance. |
| $DCG_{demote}$ and $DCG_{premote}$ | on recency ranking data, represents both recency and non-recency relevance. |

In this example, $DCG_{relevance}$ represents overall relevance on regular ranking data. Particular embodiments may compute DCG values using either the original grades (by non-recency relevance) or final grades, denoted as $DCG_{nodemote}$ or $DCG_{nopromote}$ and $DCG_{demote}$ or $DCG_{premote}$, respectively. The goal is to optimize $DCG_{demote}$ or $DCG_{premote}$ or ranking results. The pure recency metric may be represented by the difference between $DCG_{nodemote}$ and $DCG_{demote}$, and the difference between $DCG_{nopromote}$ and $DCG_{premote}$. For example, for a given $DCG_{nodemote}$, the lower the value of $DCG_{demote}$, the worse the freshness of the ranking result is.

Particular embodiments may test the efficacy of the modeling approaches with both offline and online experiments. Offline experiment means training and validating the models using ranking data, and online experiments means testing the models (derived from offline experiments) on the search engines.

Recency-sensitive query set is a subset of all search queries. Intuitively, many categories of search queries may potentially be recency-sensitive search queries. For example, a celebrity name query may be a recency-sensitive query during a short period of time when there are news related to this celebrity. Similarly, product queries, news-event queries, and many other search queries may be recency-sensitive search queries during specific time periods. On the other hand, there are some categories of queries that are unlikely to be recency-sensitive search queries (e.g., domain queries).

Due to the high dimensionality of the ranking features, it may be difficult to directly compute the distribution difference between recency ranking data corresponding to recency-sensitive search queries and relevance ranking data corresponding to search queries in general. Instead, particular embodiments may use different training/testing set combinations to explore the distribution difference. Particular embodiments may randomly select the same amount of query-resource pairs from relevance training data and call the selected data as "random training data". Particular embodiments may train two ranking models using recency training data and random training data respectively, and apply them to recency testing data and relevance testing data to compare the NDCG values. During ranking model training, recency features may be excluded because the purpose here is to explore the non-recency-related distribution. Experiments indicate that: (1) on recency testing data (i.e., for recency ranking problem), the ranking model derived from recency training data is better than that derived from random training data; and (2) on relevance training data (i.e., for generic ranking problem), the ranking model derived from random training data is better. These observations imply that there is a significant distribution difference between recency ranking data and relevance ranking data, which explains why when recency training data is used, non-recency relevance on recency testing data may be improved.

Recency features play key roles in recency ranking model learning. Particular embodiments may compute feature importance using a greedy function approximation method and rank the features by the descending order of the feature importance scores. In particular embodiments, the importance score of the most important feature in the whole feature set is 100.0. The following table shows the average ranks of the top five recency features and their average relative feature importance scores in over-weighting models with different recency training data weight, according to one set of experimental data. The more weight of recency training data is given, the higher the average rank and the average feature importance for recency features.

| Recency Training Data Weight | Average Rank | Average Score |
|---|---|---|
| 0.0 | 63.1 | 12.0 |
| 1.0 | 57.2 | 13.0 |
| 2.0 | 36.6 | 16.7 |
| 3.0 | 23.9 | 22.8 |
| 4.0 | 19.5 | 26.8 |

Below the most important five recency features with their importance ranks in the whole feature set (recency training data weight value is 2.0) are some other recency features of particular interests: 12th—the latest time that an external link to the URL of a network resource is discovered on the network; 19th—the earliest time that the URL of a network resource is discovered on the network; 22nd—the mean time that the external links to the URL of a network resource are discovered on the network; 28th—the timestamp that first appears in the content of a network resource in word-view order; 29th—the earliest timestamp that appears in the content of a network resource in time order. Such data suggest that link-time features may be the most important recency features among all recency features.

Recency features correlate with relevance and other types of ranking features. For example, compared with an older web page, a fresher (i.e., newer) web page usually has fewer clicks and external links. While ranking model usually should favor the web pages with more links and clicks, it should also promote fresher web pages for recency ranking problem. Thus, recency is competing with popularity, which is usually indicated by link-based features and click-based features. During some experiments, the query-resource pairs whose orders contradict with ground-truth labeling have been examined and the result suggests that the click-based features are over-aggressive for most of the cases. This may lead to the interesting topic on how to appropriately deal with the relationship between recency and popularity. There may be other modeling approaches that may better exploit recency features and popularity based features.

Once a recency ranking model has been trained with recency features and perhaps other types of features, the recency ranking model may be used to rank the search results for recency-sensitive search queries. In particular embodiments, when a search query is received at a search engine, as illustrated in step 208, the search engine may identify a set of network resources for the search query, as illustrated in step 210.

The network resources in the set need to be ranked before they are presented to the network user requesting the search. However, not all search queries require specialized handling in ranking their corresponding network resources to promote recent content. In fact, in some cases, retrieval performance may actually degrade when a recency ranking model is applied to the network resources corresponding to time-insensitive search queries. Thus, particular embodiments may apply the recency ranking model trained with the recency features only to the network resources corresponding to those recency-sensitive search queries. For recency-insensitive search queries, particular embodiments may apply a traditional ranking model (e.g., a relevance ranking model not trained with recency features but with relevance features and perhaps other types of features).

Particular embodiments may determine whether the search query is recency-sensitive using, for example, the automatic recency classifier described above in connection with step 202, as illustrated in step 212.

If the search query is recency-sensitive (step 212, "YES"), then particular embodiments may use the recency ranking model trained with the recency features and optionally with the relevance features and other types of features to rank the set of network resources for the recency-sensitive search query, as illustrated in step 214. On the other hand, if the search query is not recency-sensitive (step 212, "NO"), then particular embodiments may apply a traditional ranking model (e.g., a relevance ranking model) to rank the set of network resources identified for the recency-insensitive search query, as illustrated in step 216.

Figure 3:
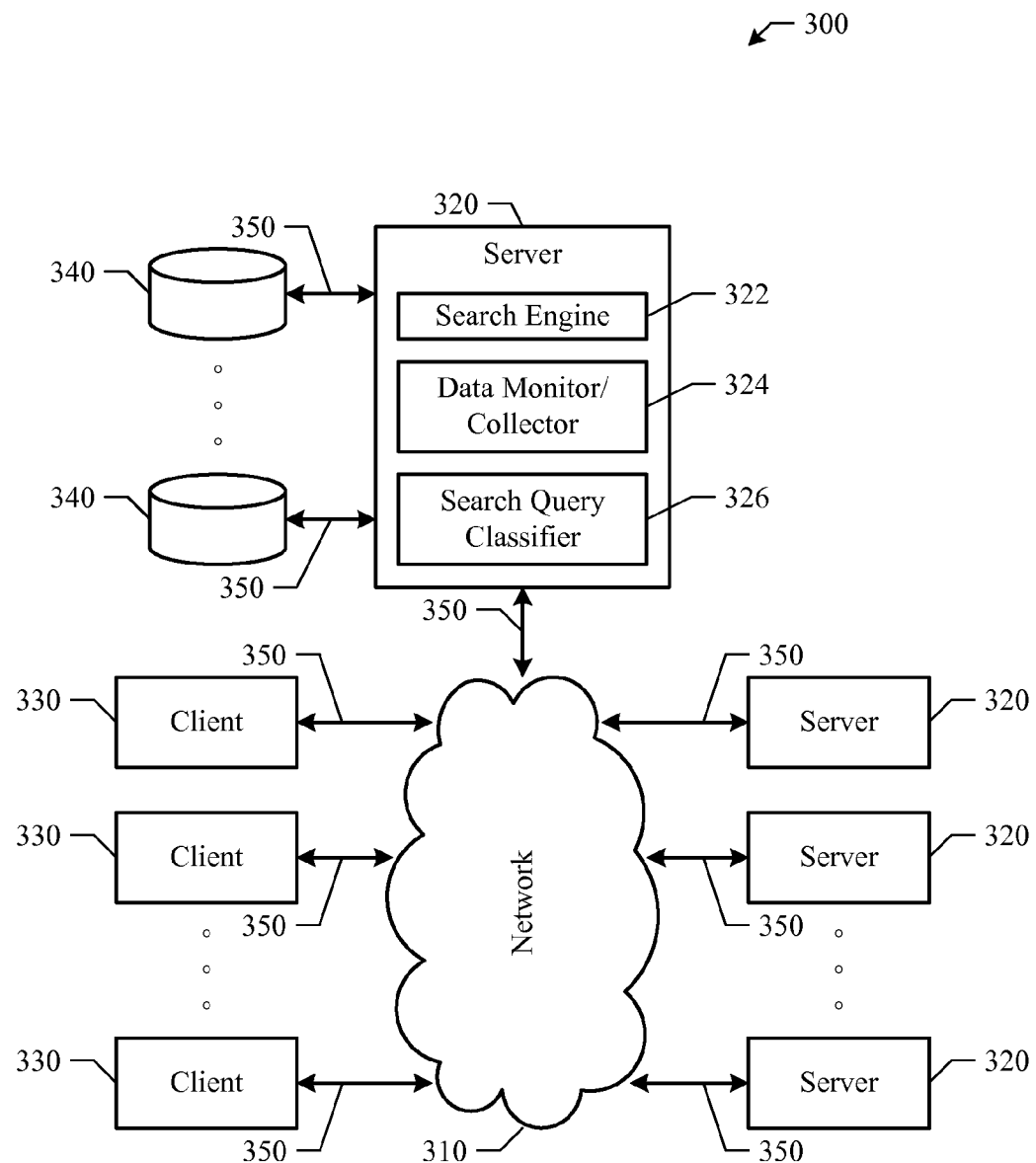
FIG. 3 illustrates an example network environment.

Particular embodiments may be implemented in a network environment. FIG. 3 illustrates an example network environment 300. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 310 or a combination of two or more such networks 310. The present disclosure contemplates any suitable network 310.

One or more links 350 couple servers 320 or clients 330 to network 310. In particular embodiments, one or more links 350 each includes one or more wired, wireless, or optical links 350. In particular embodiments, one or more links 350 each includes an intranet, an extranet, a VPN, a LAN, a WLAN, a WAN, a MAN, a communications network, a satellite network, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. A client 330 may enable an network user at client 330 to access network 310. A client 330 may have a web browser, such as Microsoft Internet Explorer or Mozilla Firefox, and may have one or more add-ons, plug-ins, or other extensions, such as Google Toolbar or Yahoo Toolbar. A client 330 may enable its user to communicate with other users at other clients 330. The present disclosure contemplates any suitable clients 330.

In particular embodiments, one or more data storages 340 may be communicatively linked to one or more severs 320 via one or more links 350. In particular embodiments, data storages 340 may be used to store various types of information. In particular embodiments, the information stored in data storages 340 may be organized according to specific data structures. Particular embodiments may provide interfaces that enable servers 320 or clients 330 to manage (e.g., retrieve, modify, add, or delete) the information stored in data storage 340.

In particular embodiments, a server 320 may include a search engine 322. Search engine 322 may include hardware, software, or embedded logic components or a combination of two or more such components for carrying out the appropriate functionalities implemented or supported by search engine 322. For example and without limitation, search engine 322 may implement one or more search algorithms that may be used to identify network resources in response to the search queries received at search engine 322, one or more ranking algorithms that may be used to rank the identified network resources, one or more summarization algorithms that may be used to summarize the identified network resources, and so on. The ranking algorithms implemented by search engine 322 may be trained using the recency features.

In particular embodiments, a server 320 may also include a data monitor/collector 324. Data monitor/collection 324 may include hardware, software, or embedded logic components or a combination of two or more such components for carrying out the appropriate functionalities implemented or supported by data collector/collector 324. For example and without limitation, data monitor/collector 324 may monitor and collect network traffic data at sever 320 and store the collected network traffic data in one or more data storage 340. The data may then be processed to extract search queries received at search engine 322 and search results generated by search engine 322.

In particular embodiments, a server 320 may also include an automatic search query classifier 326. Search query classifier 326 may include hardware, software, or embedded logic components or a combination of two or more such components for carrying out the appropriate functionalities implemented or supported by Search query classifier 326. For example, search query classifier 326 may determined, for each search query received at search engine 322, whether the search query is recency-sensitive.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 4:
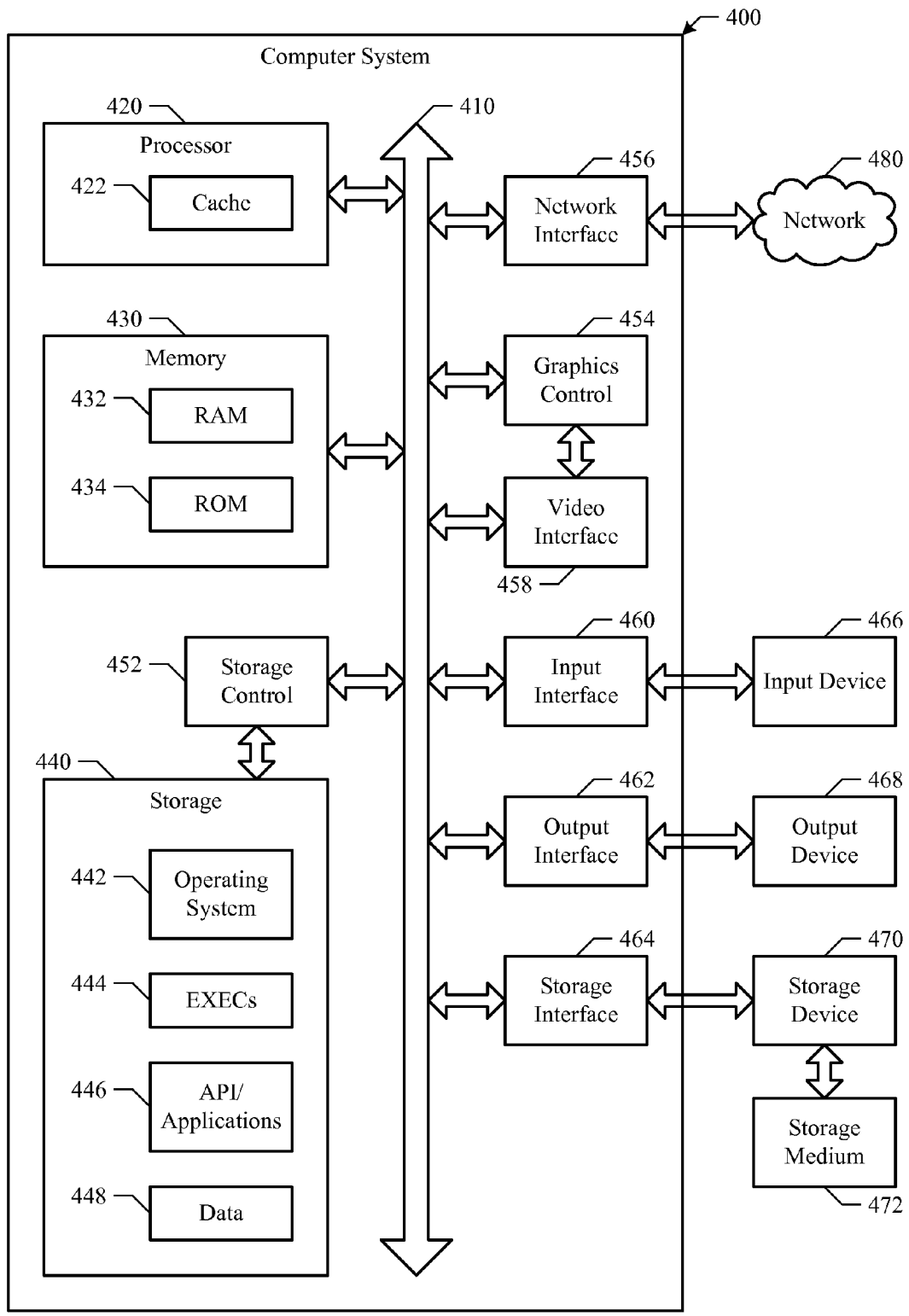
FIG. 4 illustrates an example computer system.

For example, FIG. 4 illustrates an example computer system 400 suitable for implementing one or more portions of particular embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 410 couples subsystems of computer system 400 to each other. Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 420 (or central processing units (CPUs)). A processor 420 may contain a cache 422 for temporary local storage of instructions, data, or computer addresses. Processors 420 are coupled to one or more storage devices, including memory 430. Memory 430 may include random access memory (RAM) 432 and read-only memory (ROM) 434. Data and instructions may transfer bidirectionally between processors 420 and RAM 432. Data and instructions may transfer unidirectionally to processors 420 from ROM 434. RAM 432 and ROM 434 may include any suitable computer-readable storage media.

Computer system 400 includes fixed storage 440 coupled bi-directionally to processors 420. Fixed storage 440 may be coupled to processors 420 via storage control unit 452. Fixed storage 440 may provide additional data storage capacity and may include any suitable computer-readable storage media. Fixed storage 440 may store an operating system (OS) 442, one or more executables 444, one or more applications or programs 446, data 448, and the like. Fixed storage 440 is typically a secondary storage medium (such as a hard disk) that is slower than primary storage. In appropriate cases, the information stored by fixed storage 440 may be incorporated as virtual memory into memory 430.

Processors 420 may be coupled to a variety of interfaces, such as, for example, graphics control 454, video interface 458, input interface 460, output interface 462, and storage interface 464, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 456 may couple processors 420 to another computer system or to network 480. With network interface 456, processors 420 may receive or send information from or to network 480 in the course of performing steps of particular embodiments. Particular embodiments may execute solely on processors 420. Particular embodiments may execute on processors 420 and on one or more remote processors operating together.

In a network environment, where computer system 400 is connected to network 480, computer system 400 may communicate with other devices connected to network 480. Computer system 400 may communicate with network 480 via network interface 456. For example, computer system 400 may receive information (such as a request or a response from another device) from network 480 in the form of one or more incoming packets at network interface 456 and memory 430 may store the incoming packets for subsequent processing. Computer system 400 may send information (such as a request or a response to another device) to network 480 in the form of one or more outgoing packets from network interface 456, which memory 430 may store prior to being sent. Processors 420 may access an incoming or outgoing packet in memory 430 to process it, according to particular needs.

Computer system 400 may have one or more input devices 466 (which may include a keypad, keyboard, mouse, stylus, etc.), one or more output devices 468 (which may include one or more displays, one or more speakers, one or more printers, etc.), one or more storage devices 470, and one or more storage medium 472. An input device 466 may be external or internal to computer system 400. An output device 468 may be external or internal to computer system 400. A storage device 470 may be external or internal to computer system 400. A storage medium 472 may be external or internal to computer system 400.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 430 may include one or more computer-readable storage media embodying software and computer system 400 may provide particular functionality described or illustrated herein as a result of processors 420 executing the software. Memory 430 may store and processors 420 may execute the software. Memory 430 may read the software from the computer-readable storage media in mass storage device 430 embodying the software or from one or more other sources via network interface 456. When executing the software, processors 420 may perform one or more steps of one or more processes described or illustrated herein, which may include defining one or more data structures for storage in memory 430 and modifying one or more of the data structures as directed by one or more portions the software, according to particular needs. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, implemented on at least one machine having at least one processor, storage, and a communication platform connected to a network for ranking a search result, comprising:

accessing, by the at least one machine, a set of recency ranking data comprising one or more past search queries, one or more past search results, and one or more recency features, wherein the recency features comprise:

a time-sensitive feature representing a particular time period that was determined based on content of at least some of the past search queries, wherein the at least some of the past search queries were sensitive to the particular time period, and a query timestamp feature representing the time at which the past search queries were received at a search engine;

training, by the at least one machine, a first ranking model via machine learning based on the recency features; and determining when recency is to be utilized for ranking a search result based on the ranking model.

2. The method of claim 1, further comprising:

accessing, by the at least one machine, a plurality of first search queries and a plurality of first search results, each of the first search results being generated by the search engine for one of the first search queries and comprising one or more first network resources; and for each of the first search queries, by the at least one machine, automatically determining whether the first search query is sensitive with respect to a first time period during which the first search query is received at the search engine; and if the first search query is sensitive, then including the first search query and the first search result generated for the first search query in the set of recency ranking data.

3. The method of claim 2, wherein automatically determining whether a current search query is sensitive with respect to a current time period during which the current search query is received at the search engine comprises:

defining one or more reference time periods for the current time period, each of the reference time periods being prior to the current time period;

constructing one or more current language models for the current time period, each of the current language models representing a particular type of search-related activity occurring during the current time period;

constructing one or more reference language models for each of the reference time periods, each of the reference language models corresponding to one of the current language models and representing the particular type of search-related activity represented by the corresponding current language model occurring during the corresponding reference time period;

computing a score for the current search query that represents a difference between the current search query's affinity to the current language models for the current time period and the current search query's affinity to the reference language models for each of the reference time periods; and if the score satisfies a predetermined threshold requirement, then classifying the current search query as sensitive with respect to the current time period.

4. The method of claim 1, wherein the recency features comprise:

one or more resource timestamp features each of which representing a timestamp extracted from one of the recency network resources;

one or more resource age features each of which representing, for one of the recency query-resource pairs, a difference between the query timestamp of the recency query and the resource timestamp of the recency resource;

one or more resource link-time features each of which representing a time when a link to one of the recency network resources is discovered;

one or more web-buzz features each of which representing one of the recency network resources that is popular during one particular time period; and one or more click-buzz features each of which representing one of the recency network resources that receives a higher amount of clicks during one particular time period.

5. The method of claim 1, wherein:

each of the recency features is with respect to a recency query-resource pair comprising one of the past search queries and one of recency network resources identified for the one past search query; and constructing the recency features comprises:

for each of the recency query-resource pairs, assigning, by a human judge, a grade to the recency query-resource pair based on a level of relevance that the recency network resource has with respect to the recency search query; and adjusting, by the human judge, the grade based on the recency of the recency network resource with respect to the recency search query.

6. The method of claim 1, wherein training the first ranking model via machine learning comprises training the first ranking model using only the recency features.

7. The method of claim 1, wherein training the first ranking model via machine learning comprises training the first ranking model using the recency features and a plurality of relevance features.

8. The method of claim 7, wherein training the first ranking model using the recency features and the relevance features comprises:

for each of the past search queries, determining a ranking score for each of the recency network resources comprised in the past search result generated for the past search query using a second ranking model that has been trained without any recency feature;

constructing the relevance features from the ranking scores; and applying the recency features and the relevance features to the first ranking model via machine learning.

9. The method of claim 7, wherein training the first ranking model using the recency features and the relevance features comprises:

accessing a set of relevance ranking data comprising one or more search queries and one or more search results, each of the search results being generated for one of the search queries and comprising one or more network resources;

constructing the relevance features from the set of relevance ranking data;

determining a first weight for the recency features and a second weight for the relevance features, the first weight indicating a first level of influence the recency features have on training the first ranking model, the second weight indicating a second level of influence the relevance features have on training the first ranking model; and applying the recency features according to the first weight and the relevance features according to the second weight to the first ranking model via machine learning.

10. The method of claim 7, wherein training the first ranking model using the recency features and the relevance features comprises:

adjusting a second ranking model that has been trained with the relevance features to incorporate the recency features.

11. The method of claim 1, further comprising:

accessing, by the at least one machine, a second search query received at the search engine;

identifying, by the at least one machine, a plurality of second network resources for the second search query;

automatically determining, by the at least one machine, whether the second search query is sensitive with respect to a second time period during which the second search query is received at the search engine;

if the second search query is sensitive, then ranking, by the at least one machine, the second network resources using the first ranking model that has been trained with at least the recency features; and if the second search query is not sensitive, then ranking, by the at least one machine, the second network resources using a second ranking model that has been trained without any recency feature.

12. The method of claim 1, wherein each of the recency features is with respect to a recency query-resource pair comprising one of the past search queries and one of recency network resources identified for the one past search query.

13. A system for ranking a search result, comprising:
a memory comprising instructions executable by one or more processors; and
one or more processors coupled to the memory and operable to execute the instructions, the one or more processors being operable when executing the instructions to:
access a set of recency ranking data comprising one or more past search queries, one or more past search results, and one or more recency features, wherein the recency features comprise:
a time-sensitive feature representing a particular time period that was determined based on content of at least some of the past search queries, wherein the at least some of the past search queries were sensitive to the particular time period, and
a query timestamp feature representing the time at which the past search queries were received at a search engine;
train a first ranking model via machine learning based on recency features; and
determine when recency is to be utilized for ranking a search result based on the ranking model.

14. The system of claim 13, wherein the one or more processors are further operable when executing the instructions to:
access a plurality of first search queries and a plurality of first search results, each of the first search results being generated by the search engine for one of the first search queries and comprising one or more first network resources; and
for each of the first search queries
automatically determine whether the first search query is sensitive with respect to a first time period during which the first search query is received at the search engine; and
if the first search query is sensitive, then include the first search query and the first search result generated for the first search query in the set of recency ranking data.

15. The system of claim 14, wherein to automatically determine whether a current search query is sensitive with respect to a current time period during which the current search query is received at the search engine comprises:
define one or more reference time periods for the current time period, each of the reference time periods being prior to the current time period;
construct one or more current language models for the current time period, each of the current language models representing a particular type of search-related activity occurring during the current time period;
construct one or more reference language models for each of the reference time periods, each of the reference language models corresponding to one of the current language models and representing the particular type of search-related activity represented by the corresponding current language model occurring during the corresponding reference time period;
compute a score for the current search query that represents a difference between the current search query's affinity to the current language models for the current time period and the current search query's affinity to the reference language models for each of the reference time periods; and if the score satisfies a predetermined threshold requirement, then classify the current search query as sensitive with respect to the current time period.

16. The system of claim 13, wherein
the recency features comprise:
one or more resource timestamp features each of which representing a timestamp extracted from one of the recency network resources;
one or more resource age features each of which representing, for one of the recency query-resource pairs, a difference between the query timestamp of the recency query and the resource timestamp of the recency resource;
one or more resource link-time features each of which representing a time when a link to one of the recency network resources is discovered;
one or more web-buzz features each of which representing one of the recency network resources that is popular during one particular time period; and
one or more click-buzz features each of which representing one of the recency network resources that receives a higher amount of clicks during one particular time period.

17. The system of claim 13, wherein:
each of the recency features is with respect to a recency query-resource pair comprising one of the past search queries and one of recency network resources identified for the one past search query; and
to construct the recency features comprises:
for each of the recency query-resource pairs,
assign, by a human judge, a grade to the recency query-resource pair based on a level of relevance that the recency network resource has with respect to the recency search query; and
adjust, by the human judge, the grade based on the recency of the recency network resource with respect to the recency search query.

18. The system of claim 13, wherein to train the first ranking model via machine learning comprises train the first ranking model using only the recency features.

19. The system of claim 13, wherein to train the first ranking model via machine learning comprises train the first ranking model using the recency features and a plurality of relevance features.

20. The system of claim 19, wherein to train the first ranking model using the recency features and the relevance features comprises:
for each of the past search queries, determine a ranking score for each of the recency network resources comprised in the past search result generated for the past search query using a second ranking model that has been trained without any recency feature;
construct the relevance features from the ranking scores; and
apply the recency features and the relevance features to the first ranking model via machine learning.

21. The system of claim 19, wherein to train the first ranking model using the recency features and the relevance features comprises:
access a set of relevance ranking data comprising one or more search queries and one or more search results, each of the search results being generated for one of the search queries and comprising one or more network resources;
construct the relevance features from the set of relevance ranking data;

determine a first weight for the recency features and a second weight for the relevance features, the first weight indicating a first level of influence the recency features have on training the first ranking model, the second weight indicating a second level of influence the relevance features have on training the first ranking model; and apply the recency features according to the first weight and the relevance features according to the second weight to the first ranking model via machine learning.

22. The system of claim 19, wherein to train the first ranking model using the recency features and the relevance features comprises:

adjust a second ranking model that has been trained with the relevance features to incorporate the recency features.

23. The system of claim 13, wherein the one or more processors are further operable when executing the instructions to:

access a second search query received at the search engine;

identify a plurality of second network resources for the second search query;

automatically determine whether the second search query is sensitive with respect to a second time period during which the second search query is received at the search engine;

if the second search query is sensitive, then rank the second network resources using the first ranking model that has been trained with at least the recency features; and if the second search query is not sensitive, then rank the second network resources using a second ranking model that has been trained without any recency feature.

24. One or more machine-readable tangible and non-transitory media having information for ranking a search result, wherein the information, when read by at least one machine, causes the at least one machine to:

access a set of recency ranking data comprising one or more past search queries, one or more past search results, and one or more recency features, wherein the recency features comprise:

a time-sensitive feature representing a particular time period that was determined based on content of at least some of the past search queries, wherein the at least some of the past search queries were sensitive to the particular time period, and a query timestamp feature representing the time at which the past search queries were received at a search engine;

train a first ranking model via machine learning based on the recency features; and determine when recency is to be utilized for ranking a search result based on the ranking model.

25. The media of claim 24, wherein the software is further operable when executed by the at least one machine to:

access a plurality of first search queries and a plurality of first search results, each of the first search results being generated by the search engine for one of the first search queries and comprising one or more first network resources; and for each of the first search queries automatically determine whether the first search query is sensitive with respect to a first time period during which the first search query is received at the search engine; and if the first search query is sensitive, then include the first search query and the first search result generated for the first search query in the set of recency ranking data.

26. The media of claim 25, wherein to automatically determine whether a current search query is sensitive with respect to a current time period during which the current search query is received at the search engine comprises:

define one or more reference time periods for the current time period, each of the reference time periods being prior to the current time period;

construct one or more current language models for the current time period, each of the current language models representing a particular type of search-related activity occurring during the current time period;

construct one or more reference language models for each of the reference time periods, each of the reference language models corresponding to one of the current language models and representing the particular type of search-related activity represented by the corresponding current language model occurring during the corresponding reference time period;

compute a score for the current search query that represents a difference between the current search query's affinity to the current language models for the current time period and the current search query's affinity to the reference language models for each of the reference time periods; and if the score satisfies a predetermined threshold requirement, then classify the current search query as sensitive with respect to the current time period.

27. The media of claim 24, wherein
the recency features comprise:

one or more resource timestamp features each of which representing a timestamp extracted from one of the recency network resources;

one or more resource age features each of which representing, for one of the recency query-resource pairs, a difference between the query timestamp of the recency query and the resource timestamp of the recency resource;

one or more resource link-time features each of which representing a time when a link to one of the recency network resources is discovered;

one or more web-buzz features each of which representing one of the recency network resources that is popular during one particular time period; and one or more click-buzz features each of which representing one of the recency network resources that receives a higher amount of clicks during one particular time period.

28. The media of claim 24, wherein:

each of the recency features is with respect to a recency query-resource pair comprising one of the past search queries and one of recency network resources identified for the one past search query; and to construct the recency features comprises:

for each of the recency query-resource pairs, assign, by a human judge, a grade to the recency query-resource pair based on a level of relevance that the recency network resource has with respect to the recency search query; and adjust, by the human judge, the grade based on the recency of the recency network resource with respect to the recency search query.

29. The media of claim 24, wherein to train the first ranking model via machine learning comprises train the first ranking model using only the recency features.

30. The media of claim 24, wherein to train the first ranking model via machine learning comprises train the first ranking model using the recency features and a plurality of relevance features.

31. The media of claim 30, wherein to train the first ranking model using the recency features and the relevance features comprises:
- for each of the past search queries, determine a ranking score for each of the recency network resources comprised in the past search result generated for the past search query using a second ranking model that has been trained without any recency feature;
- construct the relevance features from the ranking scores; and
- apply the recency features and the relevance features to the first ranking model via machine learning.

32. The media of claim 30, wherein to train the first ranking model using the recency features and the relevance features comprises:
- access a set of relevance ranking data comprising one or more search queries and one or more search results, each of the search results being generated for one of the search queries and comprising one or more network resources;
- construct the relevance features from the set of relevance ranking data;
- determine a first weight for the recency features and a second weight for the relevance features, the first weight indicating a first level of influence the recency features have on training the first ranking model, the second weight indicating a second level of influence the relevance features have on training the first ranking model; and
- apply the recency features according to the first weight and the relevance features according to the second weight to the first ranking model via machine learning.

33. The media of claim 30, wherein to train the first ranking model using the recency features and the relevance features comprises:
- adjust a second ranking model that has been trained with the relevance features to incorporate the recency features.

34. The media of claim 24, wherein the software is further operable when executed by the at least one machine to:
- access a second search query received at the search engine;
- identify a plurality of second network resources for the second search query;
- automatically determine whether the second search query is sensitive with respect to a second time period during which the second search query is received at the search engine;
- if the second search query is sensitive, then rank the second network resources using the first ranking model that has been trained with at least the recency features; and
- if the second search query is not sensitive, then rank the second network resources using a second ranking model that has been trained without any recency feature.

* * * * *